United States Patent
Wickboldt et al.

(10) Patent No.: US 9,158,958 B2
(45) Date of Patent: Oct. 13, 2015

(54) SIGNAL STRENGTH ENHANCEMENT IN A BIOMETRIC SENSOR ARRAY

(71) Applicant: SYNAPTICS INCORPORATED, San Jose, CA (US)

(72) Inventors: Paul Wickboldt, Walnut Creek, CA (US); Gregory Lewis Dean, Phoenix, AZ (US); Erik Jonathon Thompson, Phoenix, AZ (US); Steven Molesa, San Jose, CA (US); Jaswinder Jandu, Chandler, AZ (US); Patrick Smith, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/339,656

(22) Filed: Jul. 24, 2014

(65) Prior Publication Data

US 2015/0030217 A1    Jan. 29, 2015

Related U.S. Application Data

(60) Provisional application No. 61/858,017, filed on Jul. 24, 2013, provisional application No. 61/858,067, filed on Jul. 24, 2013.

(51) Int. Cl.
| | |
|---|---|
| *G06K 9/00* | (2006.01) |
| *G06K 19/077* | (2006.01) |
| *G07C 9/00* | (2006.01) |
| *A61B 5/117* | (2006.01) |
| *H04N 21/4415* | (2011.01) |

(52) U.S. Cl.
CPC ...... *G06K 9/00026* (2013.01); *G06K 19/07756* (2013.01); *A61B 5/117* (2013.01); *G07C 9/00071* (2013.01); *G07C 2009/00095* (2013.01); *H04N 21/4415* (2013.01)

(58) Field of Classification Search
CPC ............... G06K 9/00026; G06K 19/07756; G07C 9/00071; G07C 2009/00095; A61B 5/117; H04N 21/4415; H04L 9/3231; G06F 21/32; G06F 3/044; H01L 27/14678
See application file for complete search history.

(56) References Cited

U.S. PATENT DOCUMENTS

| | | | |
|---|---|---|---|
| 6,408,087 | B1 | 6/2002 | Kramer |
| 7,099,496 | B2 | 8/2006 | Benkley, III |

(Continued)

FOREIGN PATENT DOCUMENTS

WO        02095349 A1    11/2002

*Primary Examiner* — Manav Seth
(74) *Attorney, Agent, or Firm* — Leydig, Voit & Mayer, Ltd.

(57) ABSTRACT

A biometric imager may comprise a plurality of sensor element traces formed in or on a sensor substrate which may comprise at least a portion of a display screen defining a biometric sensing area and forming in-active pixel locations; an auxiliary active circuit formed in or on the sensor substrate on the periphery of the biometric sensing area and in direct or indirect electrical contact with the sensor element traces; and providing a signal processing interface to a remotely located controller integrated circuit. The sensor element traces may form a portion of one dimensional linear sensor array or pixel locations in a two dimensional grid array capacitive gap biometric imaging sensor. The auxiliary circuit may provide pixel location selection or pixel signal amplification. The auxiliary circuit may be mounted on a surface of the display screen. The auxiliary circuit further comprising a separate pixel location selection controller circuit.

20 Claims, 23 Drawing Sheets

(56) References Cited

U.S. PATENT DOCUMENTS

| | | | |
|---|---|---|---|
| 7,256,589 B2 | 8/2007 | Andrade | |
| 7,616,786 B2 | 11/2009 | Setlak | |
| 7,755,369 B2 | 7/2010 | Chuang et al. | |
| 7,835,553 B2 | 11/2010 | Miyasaka | |
| 8,115,497 B2 | 2/2012 | Gozzini | |
| 8,131,026 B2 * | 3/2012 | Benkley et al. | 382/124 |
| 8,204,281 B2 * | 6/2012 | Satyan et al. | 382/124 |
| 8,229,184 B2 * | 7/2012 | Benkley et al. | 382/124 |
| 8,243,027 B2 * | 8/2012 | Hotelling et al. | 345/173 |
| 8,276,816 B2 * | 10/2012 | Gardner | 235/440 |
| 8,391,568 B2 * | 3/2013 | Satyan | 382/124 |
| 8,421,890 B2 | 4/2013 | Benkley, III | |
| 8,502,796 B1 * | 8/2013 | Yilmaz | 345/173 |
| 8,724,038 B2 * | 5/2014 | Ganapathi et al. | 349/12 |
| 8,743,082 B2 * | 6/2014 | Ganapathi et al. | 345/174 |
| 8,811,688 B2 * | 8/2014 | Benkley et al. | 382/124 |
| 9,024,910 B2 * | 5/2015 | Stephanou et al. | 345/174 |
| 2002/0054695 A1 | 5/2002 | Bjorn et al. | |
| 2003/0016849 A1 | 1/2003 | Andrade | |
| 2005/0094855 A1 * | 5/2005 | Proano et al. | 382/124 |
| 2011/0102567 A1 | 5/2011 | Erhart | |
| 2011/0102569 A1 | 5/2011 | Erhart | |
| 2011/0267298 A1 | 11/2011 | Erhart et al. | |
| 2012/0085822 A1 | 4/2012 | Setlak et al. | |
| 2012/0242635 A1 | 9/2012 | Erhart et al. | |
| 2013/0017720 A1 | 1/2013 | Maegawa | |
| 2013/0169590 A1 | 7/2013 | Wickboldt et al. | |
| 2013/0177220 A1 | 7/2013 | Erhart et al. | |
| 2013/0258142 A1 | 10/2013 | Russo | |
| 2013/0265137 A1 | 10/2013 | Nelson et al. | |
| 2014/0103943 A1 | 4/2014 | Dunlap et al. | |

* cited by examiner

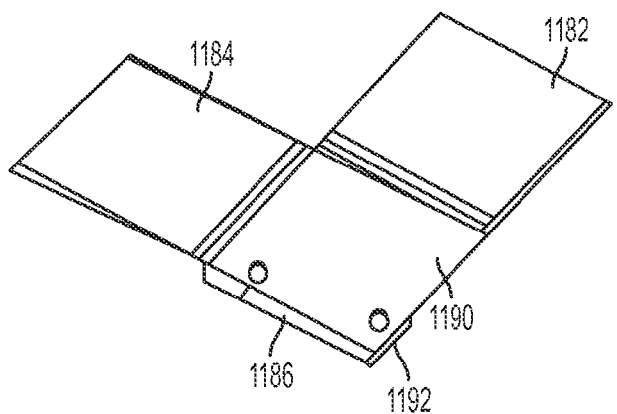
FIG. 14B (1)
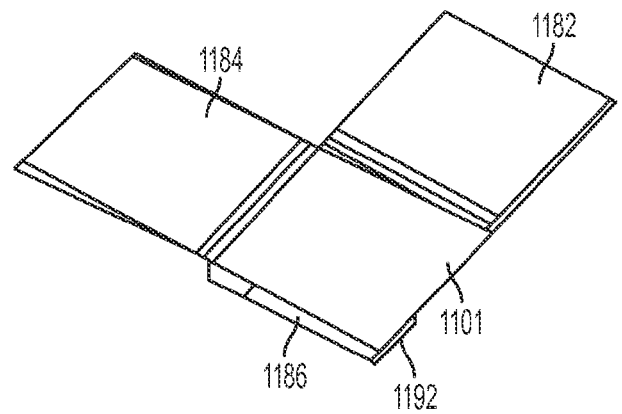
FIG. 14B (2)
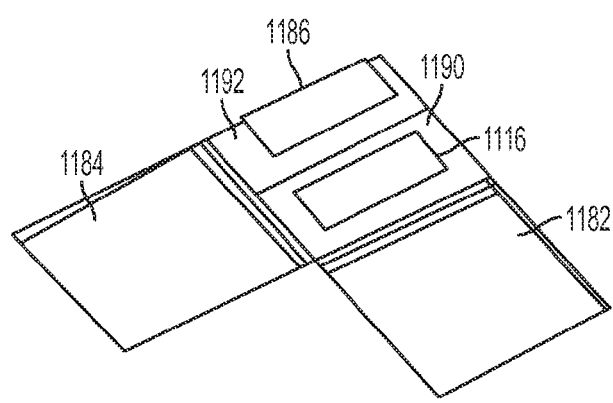
FIG. 14B (3)

| DATE | SAMPLE ID | SENSOR TYPE | RESIN | NANOPOWDER | DETAILS | SIZE | WT% | THICKNESS (μm) | MEASUREMENT #1 ||| TO FIG. 28-2 |
|------|-----------|-------------|-------|------------|---------|------|-----|----------------|--------|-------|-------|---|
|      |           |             |       |            |         |      |     |                | SIGNAL | NOISE | SNR   |   |
| 3/29/2013 | 1303291 | RAPTOR 30B | 3M CLEAR DP270 | NONE |  |  |  | 99 | 65.513 | 7.05 | 9.293 |  |
| 3/29/2013 | 1303292 | RAPTOR 30B | 3M CLEAR DP270 | Al₂O₃ |  | GRIT 1200 | 23 | 91.4 | 101.744 | 4.799 | 21.201 |  |
| 4/5/2013 | 1304051 | RAPTOR 30B | 3M CLEAR DP270 | NONE CNT + TiO₂* | CNT 10 wt% |  |  |  | 99.472 | 6.232 | 15.961 |  |
| 4/5/2013 | 1304052 | RAPTOR 30B | 3M CLEAR DP270 | TiO₂ |  | 100 nm | 10.2 |  | 171.928 | 5.294 | 32.476 |  |
| 4/5/2013 | 1304053 | RAPTOR 30B | 3M CLEAR DP270 | BaTiO₃ | CUBIC | 100 nm | 10.1 |  | 144.181 | 5.64 | 25.564 |  |
| 4/5/2013 | 1304054 | RAPTOR 30B | 3M CLEAR DP270 | SrTiO₃ | CUBIC | 100 nm | 10 |  | 155.868 | 5.969 | 26.113 |  |
| 4/5/2013 | 1304055 | RAPTOR 30B | 3M CLEAR DP270 | Al₂O₃ |  | GRIT 1200 | 10.1 |  | 121.102 | 6.016 | 20.130 |  |
| 4/5/2013 | 1304056 | RAPTOR 30B | 3M CLEAR DP270 |  |  |  | 10.1 |  | 92.034 | 6.081 | 15.135 |  |

FIG. 28-1

| DATE | SAMPLE ID | SENSOR TYPE | MEASUREMENT #2 | | | MEASUREMENT #3 | | | MEASUREMENT #4 | | | MEASUREMENT #5 | | |
|---|---|---|---|---|---|---|---|---|---|---|---|---|---|---|
| | | | SIGNAL | NOISE | SNR | SIGNAL | NOISE | SNR | SIGNAL | NOISE | SNR | SIGNAL | NOISE | SNR |
| 3/29/2013 | 1303291 | RAPTOR 30B | 75.947 | 7.017 | 10.823 | 75.189 | 7.036 | 10.686 | 70.767 | 7.033 | 10.062 | 67.724 | 7.036 | 9.625 |
| 3/29/2013 | 1303292 | RAPTOR 30B | 114.613 | 4.775 | 24.003 | 116.804 | 4.817 | 24.248 | 108.638 | 4.794 | 22.661 | 111.962 | 4.799 | 23.330 |
| 4/5/2013 | 1304051 | RAPTOR 30B | 93.643 | 6.252 | 14.978 | 95.992 | 6.25 | 15.359 | 93.141 | 6.22 | 14.974 | 94.072 | 6.253 | 15.044 |
| 4/5/2013 | 1304052 | RAPTOR 30B | 174.4 | 5.353 | 32.580 | 166.829 | 5.325 | 31.329 | 176.923 | 5.373 | 32.928 | 173.427 | 5.385 | 32.206 |
| 4/5/2013 | 1304053 | RAPTOR 30B | 144.213 | 5.872 | 24.559 | 150.942 | 5.854 | 25.784 | 148.157 | 5.835 | 25.391 | 149.891 | 5.834 | 25.693 |
| 4/5/2013 | 1304054 | RAPTOR 30B | 155.846 | 6.133 | 25.411 | 157.617 | 6.059 | 26.014 | 157.595 | 6.15 | 25.625 | 152.863 | 6.09 | 25.101 |
| 4/5/2013 | 1304055 | RAPTOR 30B | 119.429 | 6.137 | 19.460 | 119.427 | 6.099 | 19.581 | 113.081 | 6.126 | 18.459 | 121.352 | 6.092 | 19.920 |
| 4/5/2013 | 1304056 | RAPTOR 30B | 92.373 | 6.087 | 15.175 | 95.2 | 6.086 | 15.642 | 95.158 | 6.058 | 15.708 | 97.61 | 6.081 | 16.052 |

FIG. 28-2

| DATE | SAMPLE ID | SENSOR TYPE | SIGNAL AVERAGE | NOISE AVERAGE | SNR AVERAGE |
|---|---|---|---|---|---|
| 3/29/2013 | 1303291 | RAPTOR 30B | 71.028 | 7.034 | 10.098 |
| 3/29/2013 | 1303292 | RAPTOR 30B | 110.752 | 4.797 | 23.089 |
| 3/29/2013 | 1303292 | RAPTOR 30B | 95.264 | 6.241 | 15.263 |
| 4/5/2013 | 1304051 | RAPTOR 30B | 172.701 | 5.346 | 32.304 |
| 4/5/2013 | 1304052 | RAPTOR 30B | 147.477 | 5.807 | 25.398 |
| 4/5/2013 | 1304053 | RAPTOR 30B | 155.958 | 6.080 | 25.653 |
| 4/5/2013 | 1304054 | RAPTOR 30B | 118.878 | 6.094 | 19.510 |
| 4/5/2013 | 1304055 | RAPTOR 30B | 94.475 | 6.079 | 15.542 |

FROM FIG. 28-2

FIG. 28-3

SIGNAL STRENGTH ENHANCEMENT IN A BIOMETRIC SENSOR ARRAY

CROSS-REFERENCE

This application claims the benefit of U.S. Provisional Application Nos. 61/858,017, filed Jul. 24, 2014, entitled SIGNAL STRENGTH ENHANCEMENT IN A BIOMETRIC SENSOR ARRAY, and 61/858,067, filed Jul. 24, 2013, entitled BIOMETRIC SENSOR ON GLASS PACKAGINGS AND HOUSINGS AND METHODS THEREFOR, which applications are incorporated herein by reference.

The present application is related to U.S. patent application Ser. No. 12/914,812, filed on Oct. 28, 2010, entitled INTEGRATED FINGERPRINT SENSOR AND DISPLAY, Pub. No. US 2011/0102567 A1, published on May 5, 2011; Ser. No. 12/916,000, filed on Oct. 29, 2010, entitled SYSTEMS AND METHODS FOR SENSING FINGER PRINTS THROUGH A DISPLAY, Pub. No. US 2011/0102569 A1, published on May 5, 2011; Ser. No. 13/099,983, filed on May 3, 2011, entitled FINGERPRINT SENSOR AND INTEGRATABLE ELECTRONIC DISPLAY, Pub. No. US 2011/0267298 A1, published on Nov. 3, 2011; Pub. No. US 2012/0242635 A1 published Sep. 27, 2012, entitled FINGERPRINT SENSOR AND INTEGRATABLE ELECTRONIC DISPLAY, Pub. No. US 2012/0242635 A1, published on Sep. 27, 2012; Pub. No. US 2013/0169590 A1, published Jul. 4, 2013, entitled STRUCTURES AND MANUFACTURING METHODS FOR GLASS COVERED ELECTRODE DEVICES, Pub. No. US 2013/0169590 A1, published on Jul. 4, 2013; Pub No. US 2013/0265137 A1, published Oct. 10, 2013, entitled INTEGRATABLE FINGERPRINT SENSOR PACKAGINGS; Pub. No. US 2014/0103943 A1, published Apr. 17, 2014, entitled FINGERPRINT SENSOR AND BUTTON COMBINATIONS AND METHODS OF MAKING SAME, the disclosures of each of which are hereby incorporated by reference.

BACKGROUND

Biometric authentication systems are used for authenticating users. Biometric sensing technology provides a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Various electronic fingerprint sensing methods, techniques, and devices have been proposed and/or are currently in use or under development. For example, optical and capacitive fingerprint sensing devices are currently on the market. Like a digital camera, optical technology utilizes visible light to capture a digital image. In particular, optical technology may use a light source to illuminate an individual's finger while a sensor, e.g., a charge-coupled device ("CCD") captures an analog image. This analog image may then be converted to a digital image. Other sensors may be pressure based, e.g., using piezoelectric materials or deformable capacitive sensors, impedance based, such as resistive sensors, heat based, etc.

There are generally two types of capacitive fingerprint sensing technologies: passive and active. Both types of capacitive technologies can utilize similar principles of capacitance changes to generate fingerprint images. Passive capacitive technology typically utilizes a linear one-dimensional (1D) or a two-dimensional (2D) array of plates (i.e., electrodes or traces) to apply an electrical signal, e.g., in the form of an electrical field, such as a varying high speed (radio frequency ("RF") or the like) signal transmitted to the finger of the user from a transmitter trace and received at a receiver trace after passage through the finger. A variation in the signal caused by the impedance of the finger indicates, e.g., whether there is a fingerprint valley or ridge between the transmitter trace and the receiver trace in the vicinity of where the transmission and reception between the traces occurs. Fingerprint ridges, as an example, can typically display far less impedance (lower capacitance across the gap) than valleys, which may exhibit relatively high impedance (higher capacitance across the gap). The gaps can be between traces on the same plane, horizontal, or in different planes, vertical.

Active capacitive technology is similar to passive technology, but may require initial excitation of the epidermal skin layer of the finger by applying a current or a voltage directly to the finger. Typically, thereafter, the actual change in capacitance between the source of the voltage or current on an excitation electrode (trace) and another receptor electrode (trace) is measured to determine the presence of a valley or ridge intermediate the source electrode and the another receptor electrode. Active capacitive sensors, however, may be adversely affected by such effects as dry or worn finger print components. By contrast, passive sensors are typically capable of producing images regardless of contact resistance and require significantly less power, e.g., because of more penetration of the layer of skin of the user in the vicinity of the transmitter/receiver pair.

In some embodiments the traces may form a plurality of transmitter electrodes and a single receiver electrode or a plurality of receiver electrodes and a single transmitter electrode arranged in a linear one dimensional capacitive gap array. In such embodiments the capacitive gape may be horizontal across the gap formed by the respective ends of the plurality of traces and the single trace, whether transmitter or receiver. Advantageously such sensor systems can be very compact, inexpensive to manufacture, with the sensor element traces simply formed on a substrate, such as a flexible substrate, made of, e.g., Kapton® tape made by 3M, and reliable, e.g., due to insulation of the finger of the user from the traces and/or electric contact, etc.

In some embodiments, the traces may form a 2D grid array, e.g., with rows of transmitter/receiver traces on one substrate and columns of receiver/transmitter traces on the same or a separate substrate, e.g., laminated together with some form of dielectric between the traces to form a 2D sensor element array. Such 2D arrays may be essentially as long as the last digit of the finger forming a placement sensor element array, or shorter in the direction of the length of the finger, forming a swiped 2D array. While both the 1D linear array sensors systems and the 2D array sensor systems can operate in essentially the same way, i.e., with transmission of a signal from a transmitter trace to a receiver trace, the 2D arrays are larger in the region that must be exposed in the vicinity of the finger being sensed, and are generally more complex electronically. In addition such 2D arrays can involve higher degrees of noise and other impediments to accurate signal processing of the received signals and also more complicated software and hardware for reconstructing the fingerprint from a series of swiped 2D images accumulated during sensing in the direction of the finger and sensor elements relative movement during the swipe.

Although each of the fingerprint sensing technologies described above may generate satisfactory fingerprint images, each may be adversely affected by noise, interference, and other effects. For example, capacitive sensors may be particularly susceptible to noise and parasitic capacitive coupling, which may degrade the quality of the acquired fingerprint image. 2D arrays may be more so susceptible than linear 1D arrays. Prior attempts to reduce noise in 2D sensors have employed reference capacitors positioned at each sensor pixel to provide a method of subtracting noise contributions that affect both the finger capacitance and the reference capacitor. This technique is most effective for electrical noise at the pixel level, as seen, e.g., in U.S. Pat. No. 8,115,497B2, PIXEL SENSING CIRCUIT WITH COMMON MODE CANCELLATION, issued on Feb. 14, 2012, to Gozzini, and/or US Pub. No. US 2012/0085822 A1, entitled FINGER SENSING DEVICE INCLUDING DIFFERENTIAL MEASUREMENT CIRCUITRY AND RELATED METHODS, published on Apr. 12, 2012, referenced above. Also proposed has been the user of a reference electrode external to the sensor array, e.g., that is not affected by an actual presence of the finger of a user, such as is discussed in U.S. Pat. No. 8,421,890 B2, entitled ELECTRONIC IMAGER USING AN IMPEDANCE SENSOR GRID ARRAY AND METHOD OF MAKING, issued to Benkley on Apr. 16, 2013. Accordingly, it would be an advance in the art to reduce the effects of noise, parasitic capacitive coupling, and other effects in capacitive-type fingerprint sensing circuits.

Two-dimensional matrix format fingerprint readers have historically been built with row and column multiplexing circuits along the edge of the sensor pixel array, e.g., as illustrated in U.S. Pat. No. 7,616,786 B2, entitled FINGER BIOMETRIC SENSOR WITH SENSOR ELECTRONICS DISTRIBUTED OVER THIN FILM AND MONOCRYSTALLINE SUBSTRATES AND RELATED METHODS, issued to Setlak, et al., on Nov. 10, 2009; U.S. Pat. No. 7,835,553 B2, entitled IDENTITY AUTHENTICATION DEVICE AND FINGERPRINT SENSOR, issued to Miyasaka on Nov. 16, 2010 and U.S. Pat. No. 7,755,369 B2, issued to Chuang, et al. Mar. 23, 2010, entitled CAPACITIVE FINGERPRINT SENSOR AND THE PANEL THEREOF. This is true of both silicon substrate and glass substrate fingerprint readers. The use of such row and column multiplexing circuits all the signals to and from the individual rows and columns to be carried over a small number of signal lines. This has been done within a controller IC, but this makes the controller IC more expensive both from the standpoint of circuitry included in the IC and thus chip real estate utilized, as well as input/output connections required in the chip packaging.

According to co-pending U.S. Patent Pub US 2013/0177220 A1, entitled METHODS AND DEVICES FOR CAPACITIVE IMAGE SENSING, published Jul. 11, 2013, noise reduction in a 1D sensor array can be accomplished by subtracting an NI (background) signal from the primary finger influenced ("FI") signal as a means of subtracting out noise signals, e.g., that affect adjacent receiver lines in a linear sensor.

The emergence of portable electronic computing platforms allows functions and services to be enjoyed wherever necessary. Palmtop computers, personal digital assistants ("PDAs"), mobile telephones, portable game consoles, biometric/health monitors, and digital cameras are some everyday examples of portable electronic computing platforms. The desire for portability has driven these computing platforms to become smaller. Such portable electronic computing platforms, as well as some larger ones like lap top computer, pads and pods, electronic tablets and the like have been increasingly shown to be in need of authentication of the user to access the device or once on the device to access applications running on the device and/or to access remote applications such as websites, web-pages, user accounts, such as email of social network accounts, and engage in various forms of on-line transactions, each requiring varying degrees of authentication of the user to the device/application and the application to the user. Such processes have increasingly required input from the user of user information, e.g., in the form of user name and password/PIN, but even more so more sophisticated and secure forms of user authentication to the relying party and vice versa. For this purpose various forms of biometric user identification input, e.g., fingerprint authentication information is being required.

It is difficult to efficiently collect user authentication input information, e.g., fingerprint images or fingerprint authentication determinations and the like on these ever-smaller personal computing and communication devices. In addition, such as portable electronic computing platforms need other forms of user inputs for multiple purposes including, but not limited to, navigation: moving a cursor or a pointer to a certain location on a display; selection: choosing, or not choosing, an item or an action; and orientation: changing direction with or without visual feedback. Where the usual form of a GUI input device, e.g., an actual or virtual mouse may easily be used with and transported with a lap top computer or larger touch screen device, such as a tablet, smaller devices with concomitantly smaller display areas, such as cell phones, pads and pods, Blackberrys, etc. can be perfect candidates for sensors, such as biometric sensors and/or buttons and/or combinations thereof that can perform authentication as well as act as GUI input devices.

Prior art systems have borrowed concepts for user input from much larger personal computers. Micro joysticks, navigation bars, scroll wheels, touch pads, steering wheels and buttons have all been adopted, with limited success, in today's portable electronic computing platforms. All of these devices consume substantial amounts of valuable surface real estate on a portable device. Mechanical devices such as joysticks, navigation bars and scroll wheels can wear out and become unreliable. Because they are generally physically designed for a single task, they typically do not provide functions of other navigation devices. Their sizes and required movement on or within the device often precludes optimal ergonomic placement on portable computing platforms. Moreover, these smaller versions of their popular personal computer counterparts usually do not offer accurate or high-resolution position information, since the movement information they sense is too coarsely grained.

Most commercially available biometric image sensors, such as fingerprint image sensors that detect and measure features (e.g., valleys, ridges, and minutiae) on the surface of a finger using capacitive, thermal, optical, or other sensing technologies as noted above, fall into the two above noted categories: (1) full-size placement sensors and (2) typically smaller so-called swipe sensors, with the latter being either 1D or 2D. Placement sensors have an active sensing surface that is large enough to accommodate most of the interesting part of a finger at the same time. Generally, they are rectangular in shape with a sensing surface area of at least 100 mm2. The finger is held stationary while being imaged on the full-placement sensor.

The other type of finger image sensor, called a swipe sensor, is characterized by a strip-like imaging area that is fully sized in one direction (typically in length) but abbreviated in the other (typically width). An example is the Atrua Wings ATW100 sensor, as described by Andrade in US Patent Application US 2003/0016849 A1 published Jan. 23, 2003 (issued as U.S. Pat. No. 7,256,589 B2 on Aug. 14, 2007), and PCT publication WO 02/095349. A finger is swiped across the sensor until all parts of it are imaged, analogous to how a feed through paper document scanner operates. A sequence of slices or frames of the finger image is captured and processed to construct a composite image of the finger. As shown in U.S. Pat. No. 7,099,496 B2, entitled SWIPED APERTURE CAPACITIVE FINGERPRINT SENSING SYSTEMS AND METHODS, issued to Benkley on Aug. 29, 2006 shows a limiting case where the sensed "area" is a single linear 1D array of capacitive gaps.

Several prior art devices use a touchpad for authenticating a user and moving a cursor on a display device. A touchpad, which operates similarly to a finger image sensor, does not provide enough image resolution or capability to distinguish ridges and valleys on the fingerprint. Instead, the touchpad perceives a finger as a blob and tracks the blob location to determine movement. Therefore, a touchpad cannot follow miniscule movements, nor can it very easily detect rotational movement.

U.S. Patent Publication No. US 2002/0054695 A1, titled "Configurable Multi-Function Touchpad Device," to Bjorn et al. discloses a touchpad that can be configured to authenticate a user or to control a cursor. The touchpad attempts to enhance the function of a touchpad to include fingerprint capability. It merely absorbs the hardware of a capacitive finger image sensor into the much-larger size touchpad to achieve cost-savings. It does not disclose using the finger image data of the data collector for navigation or other device control. Moreover, as conceived, the apparatus of Bjorn, with its large size will preclude the touchpad from being used in most portable electronic computing platforms.

U.S. Pat. No. 6,408,087 B1, entitled CAPACITIVE SEMICONDUCTOR USER INPUT DEVICE, issued to Kramer on Jun. 18, 2002 discloses a system that uses a fingerprint sensor to control a cursor on the display screen of a computer. The system controls the position of a pointer on a display according to detected motion of the ridges and pores of the fingerprint. The system has a number of limitations. It uses image-based correlation algorithms and, unlike a system using a swipe sensor, requires fingerprint images with multiple ridges, typical for capacitive placement sensors. To detect a motion parallel to the direction of a ridge, the system requires the sensor to detect pores, a requirement restricting its use to high-resolution sensors of at least 500 dpi. The system detects changes in ridge width to sense changes of finger pressure. However, ridge width measurement requires a very high-resolution sensor to provide low-resolution of changes of finger pressure. The algorithm is unique to emulating a mouse and is not suitable for emulating other types of input devices, such as a joystick or a steering wheel, where screen movements are not always proportional to finger movements. For example, a joystick requires a returning to home position when there is no input and a steering wheel requires rotational movement. The system is unique to capacitive sensors where inverted amplifiers are associated with every sensor cell.

Capacitive fingerprint sensor arrays are often required to sense very small signals (e.g. associated with passive modification of a transmitted signal due to femtofarad differences in capacitance, e.g., between a transmitter electrode (trace) and a receiver electrode (trace) due to the difference between the electric field passing from the transmitter to the receiver through a finger of a user passing through a ridge or a valley of the fingerprint of the user. This can be especially so when attempting to read a fingerprint through a somewhat thick cover layer (0.100 mm or more, for example) of glass or other dielectric material. In one-dimensional fingerprint sensors which use a linear array of transmitters and a single receiver electrode, it has been suggested that the signal strength on the receiver line can be boosted by activating multiple transmitters simultaneously transmitting to the single receiver or multiple receivers receiving from the single transmitter trace, e.g., as discussed in co-pending US Patent Pub. US 2013/0177220 A1, entitled METHODS AND DEVICES FOR CAPACITIVE IMAGE SENSING, published Jul. 11, 2013.

Noise reduction methods have been proposed for 2D sensor arrays as well, as exemplified in U.S. Patent Pub. US 2013/0265137 A1 published Oct. 10, 2013, entitled INTEGRATABLE FINGERPRINT SENSOR PACKAGINGS.

A similar problem(s) can exist for two-dimensional fingerprint sensors as has been suggested for resolution in 1D linear sensor arrays, and the problem may be further complicated by the additional parasitic capacitances resulting from row/column crossovers that are not present in a one-dimensional (linear) sensor array. In order to alleviate this problem, the vast majority of capacitive two-dimensional fingerprint sensors therefore incorporate not only the capacitive sensing electrodes in each sensor pixel, but also amplification circuitry to boost the signal before it travels down the row or column line to a multiplexer or other readout circuit. The signal produced by the presence or absence of a fingerprint ridge can be further boosted by combining the signals from several receiver pixels adjacent to, or surrounding, a primary transmitter pixel, as is discussed, e.g., in US Pub US 2012/0085822 A1, with named inventors Setlak et al., published on Apr. 12, 2012.

Fingerprint readers that are intended to be at least to a large degree transparent are often fabricated on transparent glass. In this case the row and column drive and readout circuits may be contained in a silicon IC that is attached to, i.e., mounted on, the glass. However, the large number of rows and columns and fine pitch of these lines, especially on the silicon IC, requires very high resolution die attach processes and connector pads, or it may also make the silicon IC larger than necessary, to fit all the input & output pads that are necessary. For this reason fingerprint readers built on glass substrates have been built all the necessary row/column multiplexing circuits (often as well as sense amp circuits) in thin film transistor ("TFT") circuits fabricated directly on the glass, as shown, e.g., in U.S. Pat. No. 7,616,786 B2, entitled FINGER BIOMETRIC SENSOR WITH SENSOR ELECTRONICS DISTRIBUTED OVER THIN FILM AND MONOCRYSTALLINE SUBSTRATES AND RELATED METHODS, issued to Setlak on Nov. 10, 2009, where the circuitry for an operation amplifier is split between lower cost TFTs at the sensor array location and higher performance transistors within a remotely mounted control IC; U.S. Pat. No. 7,835,553 B2, entitled IDENTITY AUTHENTICATION DEVICE AND FINGERPRINT SENSOR, issued to Miyakasa on Nov. 16, 2010, in which a fingerprint sensor array and local signal processing circuitry is contained in a separate housing separable from a user device and replaceable as a unit; and U.S. Pat. No. 7,755,369 B2, entitled CAPACITIVE FINGERPRINT SENSOR AND THE PANEL THEREOF, issued to Chuang et al. on Jul. 13, 2010 in which all of the sensor circuitry, including the controller IC and in-pixel high performance circuitry, such as amplification is formed in or on the glass substrate of a display unit. Such TFT-on-glass fingerprint readers almost always include pixel select and amplification circuitry at each array sensor pixel.

Two-dimensional capacitive fingerprint sensors can be more susceptible to noise and the effects of parasitic capacitances due to their larger size and array structure as compared, e.g., to a one-dimensional (linear array) sensor. For this reason virtually all current two-dimensional fingerprint sensors incorporate in-pixel amplification, and perhaps other signal processing, circuitry. However, this means the sensor array must be made on a silicon wafer or with a technology (such as higher quality TFT technology, that can use, e.g., such high quality and thus more expensive transistor fabrication technology, e.g., TFT fabrication technology, to provide high quality semiconductor devices such as may be required for such transistors in each pixel. This increases the cost of the sensor substantially compared to a flex or glass based passive sensor matrix, e.g., where the electrodes (traces) forming the sensor elements are printed or etched on a substrate generally in a single layer process, more like printed circuit board ("PCB") fabrication process.

SUMMARY OF THE DISCLOSED SUBJECT MATTER

An aspect of the disclosure is directed to a method of imaging a biometric object. Suitable methods comprise: utilizing a biometric image sensor, comprising: a plurality of capacitive gap sensor electrode traces forming an array of biometric sensor imaging pixel locations within a biometric sensing area of the biometric image sensor, at least one of which sensor electrode traces forming a drive signal transmitter electrode trace and at least one of which sensor electrode traces forming a drive signal receiver electrode trace, wherein a change in a drive signal transmitted by a respective at least one drive signal transmitter electrode trace and received by a respective at least one drive signal receiver electrode trace is indicative of a biometric image characteristic at the respective pixel location in the array, the respective drive signal transmitter electrode trace and respective drive signal receiver electrode trace being formed on one of a single side of a first substrate and on opposite sides of the first substrate; utilizing a controller contained in an integrated circuit mounted to a second substrate remote from the biometric sensing area and in electrical contact with the sensor electrode traces; utilizing an intermediate logic circuit intermediate, or formed between, the controller and the sensor electrode traces in the biometric sensing area, which intermediate logic circuit is at least one of formed on the first substrate and formed on a third substrate mounted on the first substrate, to control an activation sequence for a subset of the plurality of the capacitive gap sensor array pixel locations in response to a single signal from the controller to the intermediate logic circuit. Additionally, a change in a resulting signal received by the at least one resulting signal receiver electrode trace is indicative of a biometric image characteristic at a respective pixel location in the array. At least one of the sensor electrode traces can be configured to form a drive signal transmitter electrode and at least one of the sensor electrode traces forming a resulting signal receiver electrode trace, the respective drive signal transmitter electrode and respective resulting signal receiver electrode trace being formed on one of a single side of a first substrate and an opposite side of the first substrate. Additionally, the first substrate and the second substrate can comprise a single substrate. In some configurations, the single substrate can comprise one of a flexible dielectric and a glass substrate. In still other configurations, the single signal from the controller can comprise a first coded control signal causing the intermediate logic circuit to one of (1) individually address a first subset of the at least one drive signal transmitter electrode traces and provide a drive signal to the respective drive signal electrode trace and (2) individually address a second subset of the at least one drive signal receiver electrode traces and connect the respective drive signal receiver electrode trace to an output of the biometric image sensor. In some configurations, the single signal from the controller comprises a first coded control signal, and in response to receiving the single signal the intermediate logic circuit is configured to individually address a subset of the at least one resulting signal receiver electrode traces and communicatively couple the respective resulting signal receiver electrode trace to an first input of the controller. Additionally, the single signal from the controller can comprise a second coded control signal causing the intermediate logic circuit to both individually address a third subset of the at least one drive signal receiver electrode traces and provide a receiver electrode trace received signal to a first output of the intermediate logic circuit and (2) individually address a fourth subset of the at least one drive signal receiver electrode traces and connect the respective drive signal receiver electrode trace received signal to a second output of the intermediate logic circuit. In other configurations, the first output can comprise a first input to a differential amplifier and the second output can comprise a second input to the differential amplifier. For example, the second coded control signal can comprise an output of a shift register set by the controller, connected to control logic routing respective individual pixel location drive signal receiver electrode traces to the respective first output or second output. The second coded control signal can comprise an output of a shift register set by the controller, communicatively coupling the control logic routing respective individual pixel location drive signal receiver electrode traces to the respective first output or second output. Additionally, the intermediate logic circuit can comprise logic circuit transistor switches formed on at least one of the first substrate and the third substrate. The logic circuit transistor can also be configured to such that the switch can comprise thin film transistors formed on the one of the first substrate and the third substrate. Additionally, the intermediate logic circuit can comprise a thin film transistor amplifier formed on one of the first substrate and the third substrate intermediate a respective drive signal receiver pixel location receiver electrode trace and the intermediate logic circuit.

Another aspect of the disclosure is directed to a biometric object imaging sensor comprising: a plurality of capacitive gap sensor electrode traces forming an array of biometric sensor imaging pixel locations within a biometric sensing area of the biometric image sensor, at least one of which sensor electrode traces forming a drive signal transmitter electrode trace and at least one of which sensor electrode traces forming a drive signal receiver electrode trace, wherein a change in a drive signal transmitted by a respective at least one drive signal transmitter electrode trace and received by a respective at least one drive signal receiver electrode trace is indicative of a biometric image characteristic at the respective pixel location in the array, the respective drive signal transmitter electrode trace and respective drive signal receiver electrode trace being formed on one of a single side of a first substrate and on opposite sides of the first substrate; a controller contained in an integrated circuit mounted to a second substrate remote from the biometric sensing area and in electrical contact with the sensor electrode traces; an intermediate logic circuit intermediate the controller and the sensor electrode traces in the biometric sensing area, which intermediate logic circuit is at least one of formed on the first substrate and formed on a third substrate mounted on the first substrate, to control an activation sequence for a subset of the plurality of the capacitive gap sensor array pixel locations in response to a single signal from the controller to the intermediate logic circuit. The first substrate and the second substrate comprise a single substrate. Additionally, the single substrate can comprise one of a flexible dielectric and a glass substrate. In at least some configurations, the single signal from the controller can comprise a first coded control signal causing the intermediate logic circuit to one of (1) individually address a first subset of the at least one drive signal transmitter electrode traces and provide a drive signal to the respective drive signal electrode trace and (2) individually address a second subset of the at least one drive signal receiver electrode traces and connect the respective drive signal receiver electrode trace to an output of the biometric imaging sensor. Additionally, the single signal from the controller can comprise a second coded control signal causing the intermediate logic circuit to both individually address a third subset of the at least one drive signal receiver electrode traces and provide a receiver electrode trace received signal to a first output of the intermediate logic circuit and (2) individually address a fourth subset of the at least one drive signal receiver electrode traces and connect the respective drive signal receiver electrode trace received signal to a second output of the intermediate logic circuit. The first output can comprise a first input to a differential amplifier and the second output can comprise a second input to the differential amplifier. Additionally, in at least some configurations, the second coded control signal can comprise an output of a shift register set by the controller, connected to control logic routing respective individual pixel location drive signal receiver electrode traces to the respective first output or second output. The intermediate logic circuit can also comprise a logic circuit transistor switches formed on at least one of the first substrate and the third substrate. In other configurations, the logic circuit transistor switches can comprise thin film transistors formed on the one of the first substrate and the third substrate. Additionally, the intermediate logic circuit can comprise a thin film transistor amplifier formed on one of the first substrate and the third substrate intermediate a respective drive signal receiver pixel location receiver electrode trace and the intermediate logic circuit.

A biometric imager is disclosed which may comprise a plurality of sensor element traces formed in or on a sensor substrate which may comprise at least a portion of a display screen defining a biometric sensing area and forming in-active pixel locations; an auxiliary active circuit formed in or on the sensor substrate on the periphery of the biometric sensing area and in direct or indirect electrical contact with each of the plurality of sensor element traces; and the auxiliary active circuit providing a signal processing interface between the plurality of sensor element traces and a remotely located controller integrated circuit. The plurality of sensor element traces may form a portion of a one dimensional linear capacitive gap biometric imaging sensor. The plurality of sensor element traces may form the rows and columns of pixel locations in a two dimensional grid array capacitive gap biometric imaging sensor. The auxiliary circuit may comprise a pixel location selection circuit or a pixel signal amplification circuit. The auxiliary circuit may be mounted on a surface of the display screen. The auxiliary circuit may further comprise a separate pixel location selection controller circuit.

Biometric sensors are disclosed. Sensors can be incorporated into a variety of packages, housings and form factors. Additionally disclosed are methods of making sensors. Additionally, biometric sensors incorporatable into a glass touch screen having an upper surface with resin which allows the signal to pass between a user's finger and a sensor without compromising the signal.

Also disclosed are devices and methods that use high dielectric constant materials that can be mixed with molding resins to boost sensor signal. A signal boosting structure ("SBS"), residing on top of the sensor, can be constructed from the modified resins after the mixing is completed in order to provide mechanical durability without lowering the sensor signal level. It was also found that the noise is less when a certain type of mixed resin is used, resulting in an increase in Signal-to-Noise Ratio ("SNR").

Prior solutions have attempted to increase the maximum allowable thickness of any materials that would come between the sensor and the finger, and 0.07 mm thick glass with approximately 0.01 mm of adhesive or 0.03 mm to 0.04 mm of decorative color coating are recognized as typical topping structures showing acceptable sensor signal levels. With the use of high dielectric constant materials as disclosed herein, the signal boosting structure can be made more thick, e.g., 0.1 mm or even greater.

It will be understood that a biometric object sensor button arrangement core and method of forming the same is disclosed which may comprise a flex material layer; a sensor controller IC mounted on one side of the flex material layer; a metallization layer comprising a plurality of sensor sensing element traces and controller IC input/output traces formed on at least one side of the flex material layer, each in electrical connection with controller IC; an encapsulation layer encapsulating the controller IC to one of the flex material layer and the metallization layer; and a protective layer covering one of the flex material layer and the metallization layer on a surface opposite from where the controller IC is mounted, comprising a dielectric material dispersed with at least one high dielectric material utilizing a dispersant. The biometric object sensor button may further comprise a fingerprint sensor button. The metallization layer may comprise a first metallization layer formed on a first surface of the flex material comprising the sensor sensing element traces and a second metallization layer formed on a second surface of the flex layer opposing the first surface of the flex layer and comprising at least some of the controller IC input output traces. The button arrangement core may further comprise an extension of the flex layer and the metallization layer extending from the encapsulation layer and a further encapsulation of the extension of the flex layer from the button arrangement core and the extension of the metallization layer from the button arrangement core to form a button arrangement package. A further encapsulation of the extension of the flex layer and a further deposition of dielectric material on the metallization layer may be included to form a button arrangement package. The button arrangement core may further comprise an adhesive layer covering the one of the flex layer and the metallization layer and the extension of the encapsulation of the flex layer and the metallization layer; and a layer of dielectric material adhered to the adhesive layer, which may be corundum and may be deposited by thin film deposition or as a thin crystalline sheet(s). The method may comprise forming a flex material layer; mounting a sensor controller IC on one side of the flex material layer; forming a metallization layer comprising a plurality of sensor sensing element traces and controller IC input/output traces formed on at least one side of the flex material layer, each in electrical connection with controller IC; encapsulating the controller IC in an encapsulation layer formed on one of the flex material layer and the metallization layer; and forming a protective layer covering one of the flex material layer and the metallization layer on a surface opposite from where the controller IC is mounted, comprising a dielectric material dispersed with at least one high dielectric material utilizing a dispersant.

INCORPORATION BY REFERENCE

All publications, patents, and patent applications mentioned in this specification are herein incorporated by reference to the same extent as if each individual publication, patent, or patent application was specifically and individually indicated to be incorporated by reference, for all purposes, including the specification, figures and claims as if the entire patent or publication was reproduced entirely herein.

BRIEF DESCRIPTION OF THE DRAWINGS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It will also be understood that the elements disclosed and illustrated in the drawing figures are described in a positional and relational sense in the present application, e.g., as "top" and "bottom," "front" and "rear," "left" and "right" in such nomenclature selected purely arbitrarily and in conformance with the illustrated relationships in the drawing figures and are not intended to delimit any such orientation of the subject matter disclosed when in actual use, or to so limit the appended claims. It will also be evident, however, that the claimed subject matter may be practiced without these specific details. In some instances, well-known structures and devices are shown in block diagram form in order to facilitate describing the claimed subject matter.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 14A-C shows a more detailed view of transmitter electrodes/traces and received electrode/trades formed on a substrate and fabrication structure;

FIGS. 28-1-28-3 show a table of results of testing with varying dielectric materials with or without high dielectric material dispersants.

DETAILED DESCRIPTION

Figure 1:
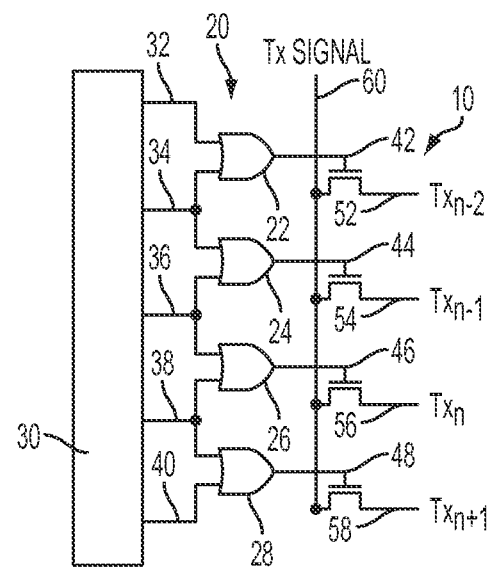
FIG. 1 shows schematically components of a portion of a biometric sensor arrangement, such as a 2D grid array fingerprint sensor transmitter drive circuit according to aspects of the disclosed subject matter.

The following description and the annexed drawings set forth in detail certain illustrative aspects of the claimed subject matter. These aspects are indicative, however, of but one or more of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

According to aspects of embodiments of the disclosed subject matter, lower complexity and therefore, generally speaking, lower cost transistors, including TFT transistors made with lower cost TFT technologies, may be used with the sensor array to perform individual pixel signal processing or at least selection and control outside of the pixel array.

According to aspects of the disclosed subject matter a larger sensing signal may be obtained, e.g., by increasing the signal that is coupled from the transmitter pixel to the finger. This can provide, e.g., an alternative to the multiple receiver approach described above. When incorporating the appropriate logic circuitry in the transmitter line driver circuits that operate on much larger signals that the receiver circuits, the demands on the transmitters (rows in one embodiment) multiplexing circuits can be far less stringent than for multiplexing that is done on the receiver lines, e.g., because they are carrying much smaller signals. Providing in-pixel amplification circuitry can reduce the demands on the receiver circuitry considerably. However, in-pixel amplification, as noted above, can be costly and use a good deal of pixel real estate to implement and the amplification may itself be of relatively low performance, e.g., noisy and lacking in much gain.

According to aspects of embodiments of the disclosed subject matter a sensor pixel array may be fabricated which does not require any TFT circuitry in the array itself, i.e., at the respective pixel locations, or at least no higher performance TFTs. The extra processing cost of fabricating such higher cost TFT circuitry on the glass can effectively be removed from the fabrication process over the majority or all of the of the array substrate. In addition to controlling which transmitter lines and/or pixels are activated simultaneously, it may be advantageous to activate certain transmitters or combinations of transmitters, including doing so at different voltages to achieve an improved fingerprint image from the receiver circuits. A best available or optimized combination of signals achieving the desired signal strength (e.g., reducing the noise in the fingerprint image) and fingerprint image resolution, e.g., number of rows and columns may be empirically and/or dynamically determined and utilized. In much the same manner that multiple transmitter/receiver lines can be activated simultaneously to increase the signal strength in a 1D linear sensor element array, multiple receiver lines can also be tied together, e.g., in the readout multiplexer circuit to increase the strength of the signal that is passed on to the receiver line(s) sense amplifier.

Activating multiple transmitter pixels in a two-dimensional fingerprint sensor pixel array can be accomplished in several forms. For two-dimensional sensor arrays, as an example, which are operated in a passive mode, e.g., including no active (such as, TFT) circuitry at each pixel, this can be accomplished in its simplest form by activating more than one transmitter line at a time. As is known, if the transmitter signals are all generated in a single controller integrated circuit ("IC"), or cooperating controller IC, the IC(s) may contain logic circuitry to activate multiple transmitters in specific patterns simultaneously in a fashion similar to the one-dimensional sensor case referenced above.

Alternatively, and according to aspects of embodiments of the disclosed subject matter, the transmitter signals can pass to the sensor array electrodes, e.g., in a sensor array finger sensing area, e.g., through a secondary circuit residing on the same substrate as the sensor array electrodes (which may be a silicon wafer, glass sheet, plastic sheet, or any other dielectric-coated substrate). This can be, e.g., in the form of multiplexer circuitry formed, e.g., of TFTs formed in or on the array substrate or in an added layer, such as a polysilicon layer on the glass, flex, or the like substrate for the sensor array traces, and can be of simple logic design, e.g., requiring fewer or no polycrystalline silicon devices and/or larger device sizes or at least less high performance devices than would be required to implement pixel selection/multiplexing and/or amplification at the pixel cell level. Logic circuitry can be added to the transmitter line multiplexers that precede the analog line driver circuits. In this case specific combinations of outputs from the primary shift register in the transmitter multiplexer may be combined to activate specific patterns of transmitter line drivers, or the shift register itself may be modified to produce a different pattern of output signals.

A 2D touch sensor and/chip on glass arrangement along with certain packaging techniques can be beneficial for applications of biometric, e.g., fingerprint sensors for use in authentication applications such as on small user electronic devices, e.g., portable cell phone, iPad®, tablets, personal digital assistants, such as Blackberry® mobile devices, etc. According to aspects of embodiments of the disclosed subject matter, the use of mold plastic around the edge of the glass, e.g., in a button configuration, such as may utilize the same glass as a surrounding display screen, such as a touch screen, into which the button may be inserted in an opening in the display screen, advantageously having the same glass and thus the same or relatively the same coefficient of thermal expansion ("CTE"). Electrical connections may be brought out on the side or the back ("underside") of the button, with the glass exposed on the top side.

There may be several options for electrical connections as described in connection with the figures below. In one example, a printed circuit board ("PCB") type design, utilizing, e.g., a small outline package ("SOP") or small outline integrated circuit ("SOIC") surface mounted IC, can be bonded to, or inserted into an opening in a glass substrate, which substrate may be the same piece of glass that forms a 2D touch screen and to protective covering for biometric sensor elements/traces, e.g., a 1D or 2D sensor array and which may also include a sensor controller integrated circuit ("IC"). A molded enclosure utilizing suitable materials, such as epoxies or plastics may be formed with the glass exposed on one side. This invention can extend to, for example, use in a shrink small outline package ("SSOP"), such as may employ "gull wing leads", quarter-size small outline package surface mount packaging ("QSOP"), thin small outline packages ("TSOP"), thin shrink small outline packages ("TSSOP"), etc., as an example, with glass as a top surface.

For a system in a package ("SIP") embodiment according to aspects of the disclosed subject matter passive components can be added on the PCB, and complete the construction. According to aspects of the disclosed subject matter chip on glass ("COG") package concepts may also be applied, e.g., to supplement 2D sensor on glass, or stand on separate embodiments of, e.g., chip on glass packaged embodiments.

Figure 2A:
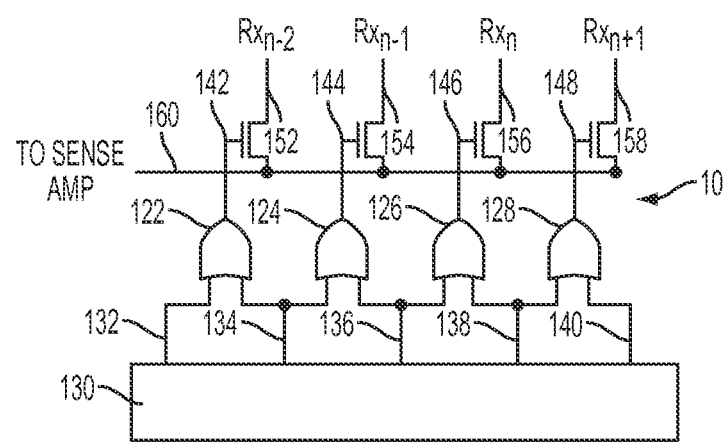
FIGS. 2A-B schematically show components of a portion of a biometric sensor arrangement, such as a 2D grid array fingerprint sensor receiver circuit according to aspects of the disclosed subject matter.
Figure 2B:
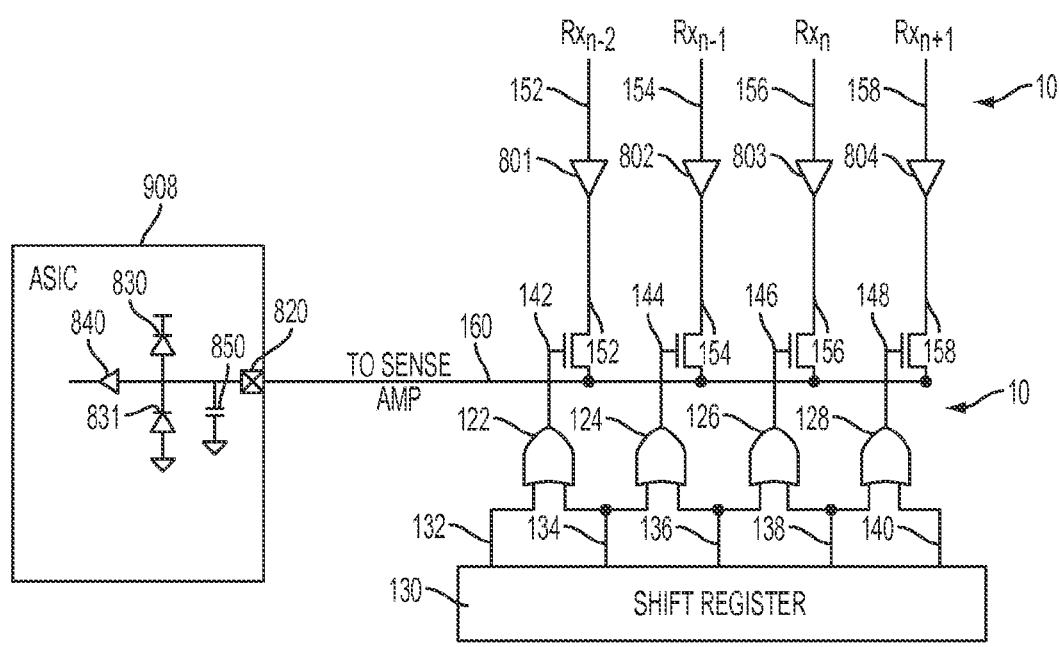

Turning to FIG. 1, as an example, one straightforward implementation for such a sensor array can be to place an array 20 of OR gates 22, 24, 26, 28 between the outputs of a shift register 30 and the line driver transistors 42, 44, 46, 48 as shown in the partial row driver circuit 10 depicted in FIGS. 2A-B. The outputs of the OR gates 22, 24, 26, 28 control the transistors 42, 44, 46, 48 to place the transmit signal 60 on the respective transmit line(s) $Tx_{n-2}$, $Tx_{n-1}$, $Tx_n$, $Tx_{n+1}$, 52, 54, 56 and 58. This can be done according to the content of the shift register 30 output on each of the outputs 32, 34, 36, 38, 40 of the shift register 30 in each clock period according to the coded content of the bits shifting through the shift register. As an example, if the content of the shift register 30 from top to bottom as shown in FIG. 1, and thus the outputs on 32, 34, 36, 38 and 40, were 0, 1, 1, 0, 0 . . . , then the transmitter lines $Tx_{n-2}$, $Tx_{n-1}$ and $Tx_n$ would be activated, since the inputs 32, 34 to OR gate 22 would be 0, 1, the inputs 32, 34 to OR gate 24 would be 1, 1, and the inputs 34, 36 to OR gate 26 would be 1, 0. The outputs of the OR gates 22, 24 and 26 would control the selection transistors 42, 44 and 46 to place the transmit signal 60 on the transmit lines $Tx_{n-2}$, $Tx_{n-1}$ and $Tx_n$. Similarly, adjacent transmitter lines $Tx_n$ and $Tx_{n-1}$ could be activated with a bit pattern of 0, 0, 1, 0, 0, resulting in the outputs of the OR gates 24 and 26 connecting transmit lines $Tx_n$ and $Tx_{n-1}$ to the transmit signal 60.

It will also be understood by those skilled in the art, that the circuit 10 of FIG. 1 is merely an example and the 2D sensor array selection/activation/multiplexing circuitry could be fabricated to cover all transmit circuit lines, e.g., all rows of the array or larger numbers of rows, but less than all rows, forming separate sections of rows of the 2D sensor array. Similarly the shift register(s) 30 could contain various bit encoding patterns such as to activate more than two adjacent transmit lines, or transmit lines separated by non-activated transmit lines, etc. The same or different patterns of activation may be implemented in each section of transmit lines controlled by a separate shift register 30.

Multiple receiver lines 152, 154, 156, 158 can be enabled with a circuit 10, as seen in FIG. 2, that is very similar to the one depicted above. In such case the line driver transistors 42, 44, 46, 48 can be replaced by pass transistors 142, 144, 146, 148 that simply pass any combination of analog signals from the selected receiver lines $Rx_{n-2}$, $Rx_{n-1}$, $Rx_n$, $Rx_{n+1}$, 152, 154, 156 and 158 to the receiver's main sense amplifier(s) 160 under the control of the OR gates 122, 124, 126, 128, based on the outputs 132, 134, 136, 138 and 140 from the shift register 130.

Figure 5:
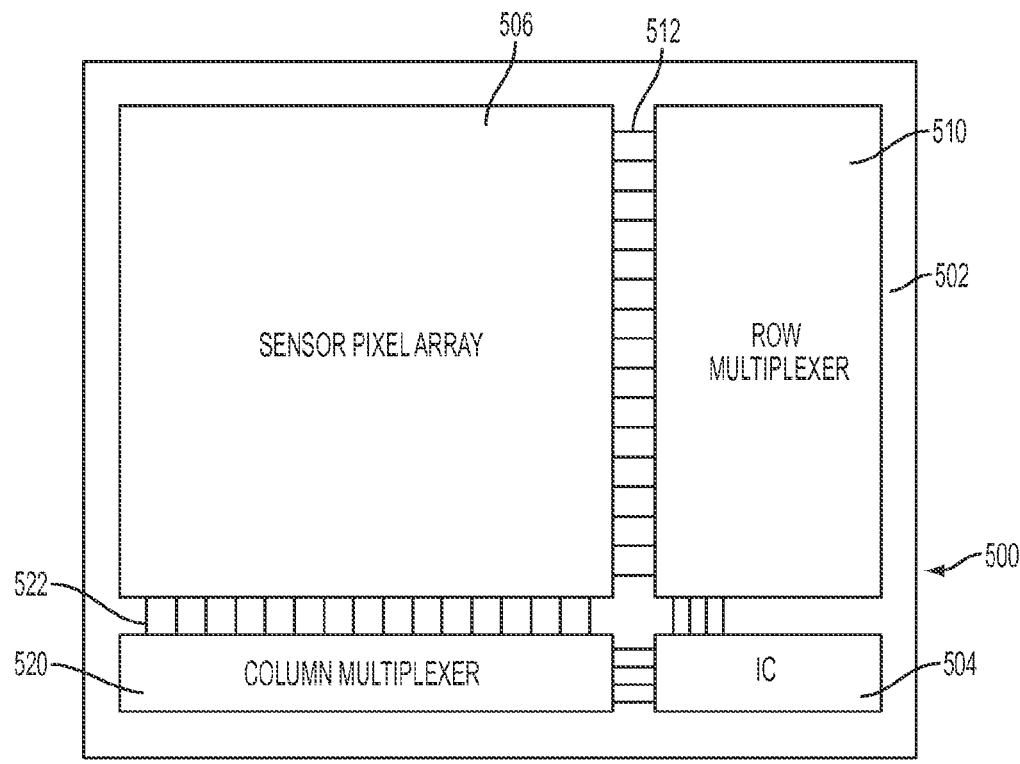
FIG. 5 illustrates partly schematically, an arrangement of a biometric sensor 2D sensor formed on a substrate with a controller IC mounted in the same substrate and intermediate circuitry also formed on the substrate or on a layer formed on the substrate, according to aspects of the disclosed subject matter.

The above discussion utilizes convention that transmitter signals are sent on the row lines $Tx_{n-2}$, $Tx_{n-1}$, $Tx_n$, $Tx_{n+1}$ as seen in FIG. 1 and received signals are received/read out on the column lines $Rx_{n-2}$ $Rx_{n-1}$, $Rx_n$, $Rx_{n+1}$, as seen in FIG. 2A, although the selection circuitry 10, could be built with the opposite orientation. Also, according to aspects of embodiments of the disclosed subject matter, if the two-dimensional sensor grid array 506 as seen in FIG. 5, interfacing with the selection circuitry 10 also is active circuitry, e.g., contains active (such as, semiconductor) elements within each pixel (not shown), e.g., to implement full active matrix operation, additional logic may be placed within a pixel cell to achieve specific patterns of activated transmitter/receiver pixels. If one or more additional (perhaps logic-level) input row or column signals are provided in the array, logic circuits in adjacent pixels can allow specific transmitter pixels near a central target pixel to be activated without activating an entire row's transmitters. While such an approach might increase the sensor readout frame rate, optimal combinations of active and inactive transmitter pixels may be found to improve the signal levels and therefore the overall fingerprint imaging done by the fingerprint image sensor.

According to aspects of the disclosed subject matter, such sensor arrays can result in significant reductions in cost. Multiplexing the transmitter and/or receiver lines on an auxiliary circuit, e.g., one implemented at or near the sensor array 506, such as on the same substrate or at least a layer deposited on the same substrate, such as a polysilicon layer in which the TFT transistors of the auxiliary circuit can be fabricated, can eliminate a large fraction of the I/O connections on the controller IC as well as circuitry on the real estate of the controller IC (not shown). This can allow a smaller, coarser, more reliable and less expensive IC and a coarser and more reliable IC-to-substrate attach process to be used. In addition, the die size and cost may also be reduced because IC size and cost is also driven by the number of required I/O pads.

According to aspects of embodiments of the disclosed subject matter, attempts to reduce the noise levels in a two-dimensional fingerprint sensor array are proposed which, e.g., compare each pixel's signal to an average signal level across another portion or portions of the 2D sensor array. Time dependent, and to some extent spatially dependent, noise that affects many pixels in close proximity in such an array simultaneously can be mitigated, according to aspects of the disclosed subject matter. This may be done, e.g., by effectively subtracting the noise which is obtained by averaging signals from other pixel locations, e.g., the pixels surrounding a target pixel, from the signal of the target pixel. Other pixels may also be selected, e.g., by empirical and/or dynamic testing to determine pixels whose signals, when selected, will most effectively, most often, most simply, etc. serve to remove the undesired noise from the pixel signal being sampled at the time.

Figure 3:
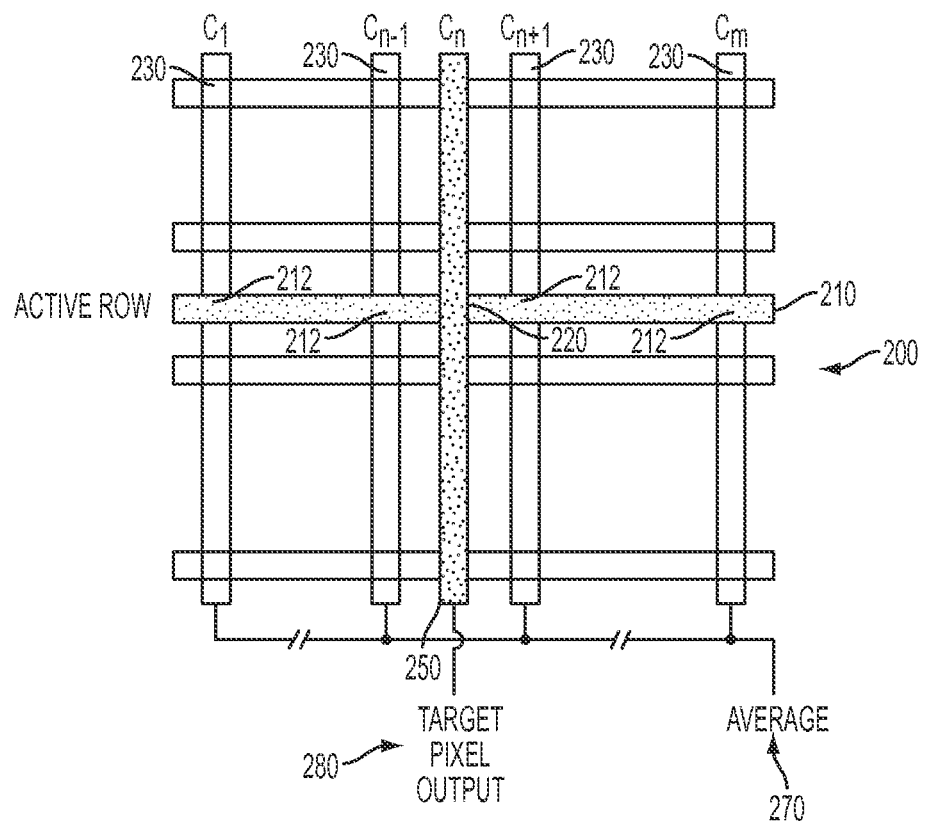
FIG. 3 shows a simplified schematic form of a portion of a 2D fingerprint sensor grid array, such as a portion of an X-Y sensor grid according to aspects of the disclosed subject matter.

According to aspects of the disclosed subject matter, an average noise signal obtained from multiple nearby sensor-to-finger capacitance readings positioned in relation to the target pixel's sensor-to-finger capacitance location, e.g., at a transmitter trace/receiver trace crossover point, can be subtracted from the target pixel received signal. This type of averaged noise subtraction can be more effective at compensating for noise and other sources of error, e.g., that might arise from sources outside the plane/area of the sensor, for example, on the surface of the finger or on the surface of the sensor's protective coating, etc. As an example, for passively addressed 2D sensor array 200, as seen in FIG. 3, the average signal for all the pixels 212 in an active row 210 except the target pixel 220 can be obtained by tying together all the other signal lines from the inactive columns 230, as opposed to the active column 250, as illustrated in FIG. 3.

A possible shortcoming of existing solutions for accounting for the added capacitance, including parasitic capacitances, due, e.g., to selecting from multiple sensor pixel element locations for activation as transmitter locations and activation as receiver locations is that the receive lines from the selected receiver pixel locations may, individually or collectively or both, be loaded down with lots of background capacitance. This can reduces their sensitivity and/or make the received signal smaller. Sources of background capacitance may include: capacitance between the receiver lines to surrounding metal (like the adjacent or surrounding transmitters or receivers); the capacitance of the switches that multiplex the receivers to a central receiver line; the capacitance of the connection to the ASIC, e.g., at the interconnection bumps and bond pads of the ASIC; the capacitance of the ESD protection structures (i.e., diodes), e.g., under the bond pads of the controller chip and the capacitance of the sensing amplifier on the controller chip. the transmitter state machine Addressing the first item, i.e., the capacitance coupling to the surrounding metal, is beyond the scope of the specific corrections addressed in this application. The other four may be mitigated, e.g., by adding an amplifier or buffer built to the signal output line(s). Such a buffer of amplifier, according to aspects of the disclosed subject matter may be formed on the same substrate as the sensor transmitter and receiver electrode traces of a separate substrate attached to that substrate. This may be done, e.g., utilizing active devices formed on such substrate, e.g., thin-film-transistor ("TFT") devices on a glass substrate, e.g., between the receiver lines and the rest of the background capacitance.

Turning to FIG. 2B, a modified version of the circuitry shown in FIG. 2A is presented. Many sources of background/parasitic capacitance are shown. For example, in a given case, such as, the selection of $R_{xn}$ 156 as the receiver electrode trace to be connected to the main receiver sense amplifier line 160 adds capacitance (not shown) to the $R_{xn}$ line 156 at the input side of the switch 146. The output side of switch 146 also adds capacitance. Additionally, on the output side of the switch 146, even though all the other switches 142, 144, 148 might be turned off, they are still connected to the main receiver sense amplifier line 160 and add capacitance to it. The routing of the main receiver sense amplifier line 160 near other conductors (other metal lines, vias, etc., not shown) adds additional capacitance to the main receiver sense amplifier line 160. The metal-to-metal capacitance due to the routing of the main receiver sense amplifier line 160 as well as the capacitance from the switches 142, 144, 146, 148, for illustration purposes are lumped into a single symbolic capacitance.

At the boundary to the controller IC, e.g., an ASIC 908, a bond pad 820 on the ASIC 908 can add significant additional capacitance. Under this bond pad 820 inside the ASIC 900 can be ESD protection circuits, shown symbolically as diodes 830 and 831. The sensing amplifier 840 can also add capacitance. All of these ASIC capacitances, for purposes of illustration are lumped into a single symbolic controller ASIC capacitance 850.

According to aspects of the disclosed subject matter reduction in the effect of these capacitances 820 can be achieved. For example, metal-to-metal routing may be carefully controlled, and sometimes the background capacitance can be reduced by eliminating or reducing the shielding around the main receiver sense amplifier line 160. Although this can reduce the background capacitance and thereby increase the sensitivity of the main receiver sense amplifier line 160, it can also increase the susceptibility to external noise sources which might otherwise have been blocked by the shielding.

Another approach may be to reduce the background capacitance, e.g., by reducing the size of the switches, as an example, switches 142, 144, 146, and 148. However, doing so can also increase the resistance of the switches 142, 144, 146 and 148, which can substantially reduce the magnitude of the received signal on the receiver sense amplifier line 160. Still another way to reduce the background capacitance can be, as an example, to reduce the size of the ESD protection circuits 830, 831. This can, however, have an undesired effect of increasing the susceptibility of damage due to an ESD strike.

Current packaging and mounting technology, e.g., for biometric object image sensing devices, such as are sold by the assignee of the present application, e.g., where the receiver lines, such as, 152, 154, 156, and 158 are created in metal on a ball grid array ("BGA") or chip on flex ("COF") substrate, the methods to reduce background capacitance described above may be the only alternatives, e.g., resulting in increased noise, increase ESD susceptibility, etc). BGA and COF technologies can block or at least limit any ability to put active devices (e.g., transistors) on the substrate, e.g., next to the receiver lines 152, 154, 156, and 158.

However, if the sensor array, e.g., 200 in FIG. 3 with, e.g., receiver electrode traces 152, 154, 156, and 158 is implemented on a glass substrate, then it is possible to use TFT's to add active devices next to the sensing array, e.g., at the interface between the sensor array 200 receiver electrode traces, e.g., 152, 154, 156 and 158, and the controller IC 900. This can, among other things, allow for the inclusion of sampling and/or amplifying circuits, e.g., amplifiers, unity gain amplifiers, or buffers 801, 802, 803, 804 between the receiver electrode trace lines 152, 154, 156, and 158 and the background capacitance 810, 850 described earlier.

The choice of whether to implement amplifiers, unity gain amplifiers, or buffers at locations 801, 802, 803, and 804 can depend on the quality of the TFTs that can be constructed on the available substrate, e.g., crystalline silicon, poly-crystalline silicon, amorphous silicon, glass (non-crystalline), etc., the physical size of the constructed TFTs, and the proximity of the TFTs to the sensor array, among other things. optimizations of these factors for the specifications for the contemplated TFT's will be well within the skill of the art, without undue experimentations, but have not been studied by applicants as yet nor has the precise TFT capability(ies) needed, The advantages of aspects of the disclosed subject matter can, however, be understood by those skilled in the art without the specifics of these TFT details. For current purposes, the elements 801, 802, 803, and 804 as unity amplifiers, otherwise known as buffers, which could consist of, e.g., a single TFT transistor in a source-follower configuration. The advantage being, in part, the TFT is more rugged than an amplifier on an ASIC IC, capable of handling a higher voltage, built on a cheaper substrate than a crystalline silicon wafer substrate, e.g., by deposition technologies typically used for, e.g., printed circuit boards ("PCB's"), etc. On the other hand, an amplifier constructed, e.g., on a crystalline silicon substrate may have better amplification gain control, larger dynamic range, less noise, etc.

Whatever is the case, adding buffers 801, 802, 803, and 804 between the receivers 152, 154, 156, and 158 and the rest of the background capacitance 810, 850, provides for the receiver electrode traces 152, 154, 156, and 158 to be loaded only by the input capacitance of the respective buffers 801, 802, 803, and 804 and not the background capacitance 810, 850 of the rest of the system. This can, e.g., substantially increase the sensitivity of the receivers 152, 154, 156, and 158. The buffers 801, 802, 803, and 804 drive the background capacitance of the rest of the system.

In such a case, active column 250, Cn, contains the active pixel 220 being read, and the signals from all other pixels 212 in the active row 210, i.e., from inactive columns 230, $C_1$ through $C_{n-1}$ and $C_{n+1}$ through $C_m$, can be combined to obtain an average 270 that can, e.g., be subtracted from the active pixel 220 signal, output 280, on the column $C_n$ output line to reduce the noise components in the signal output from the active column 250, $C_n$. The connections that tie together all the average background signal on the column lines $C_1$ through $C_{n-1}$ and $C_{n+1}$ through $C_m$ can be implemented in TFT circuitry on the sensor array 200 substrate that is part of, or precedes, the column readout multiplexer/shift register circuitry, as seen in FIG. 4.

Figure 4A:
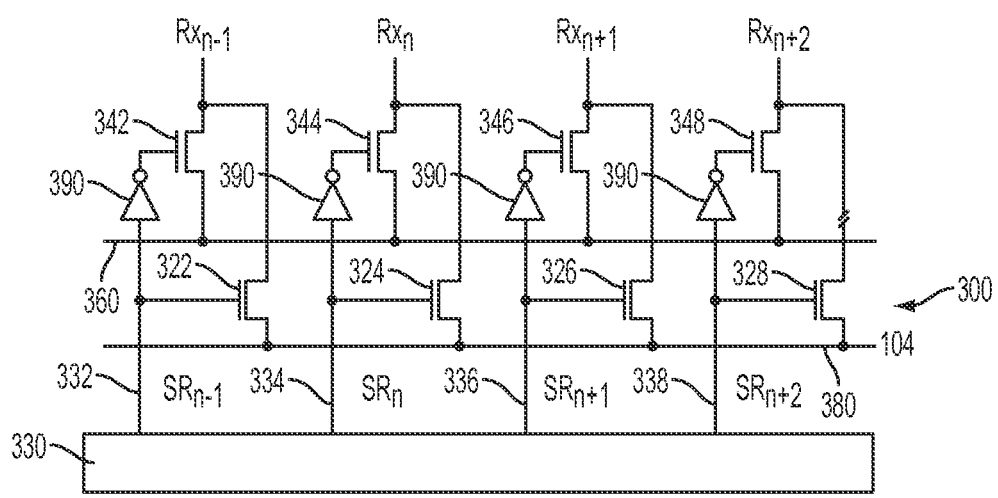
FIGS. 4A-B illustrate schematic views of a drive circuit for use with a fingerprint sensor grid array such as shown in FIG. 3, according to aspects of the disclosed subject matter.

In FIG. 4A there can be seen an example of a selector circuit 300, including a selection logic circuit, such as shift register 330. As each shift register output signal, $SR_{n-1}$, $SR_n$, $SR_{n+1}$, $SR_{n+2}$ . . . , 332, 334, 336, 338 . . . , is enabled in sequence, as an example, all of the other shift register outputs $SR_{n-1}$, $SR_n$, $SR_{n+1}$, $SR_{n+2}$ . . . , 332, 334, 336, 338, can be set low. The enabling (e.g., setting to 1) of each respective $SR_{n-1}$, $SR_n$, $SR_{n+1}$, $SR_{n+2}$ . . . , 332, 334, 336, 338, . . . , activates the respective one of the receiver traces $Rx_{n-1}$, $Rx_n$, $Rx_{n+1}$, $Rx_{n+2}$ . . . , of each respective individual active column 250 from among the columns $C_{n-1}$, $C_n$, $C_{n+1}$, $C_m$. As an example, as shown in FIG. 3, $C_n$ is active while $C_{n-1}$, $C_{n+1}$, $C_m$ . . . , are inactive. As an individual column line $SR_n$ is enabled, corresponding to column $C_n$ in FIG. 3, the receiver signal $Rx_n$ is transferred to the primary output signal line 380 through respective selection transistor, i.e., 324, from among the selection transistors 322, 324, 326 and 328. At the same time all the other lines $Rx_{n-1}$, $Rx_n$, $Rx_{n+1}$, $Rx_{n+2}$ . . . , are connected to the background/average signal line 360 through each respective column selection transistor 342, 346, 348, e.g., due to the presence of the inverters 390 on the shift register 330 outputs $SR_{n-1}$, $SR_n$, $SR_{n+1}$, $SR_{n+2}$ . . . , 332, 334, 336, 338. Additional logic may be incorporated in addition to, or replacing, the selector circuit 300, e.g., to tie specific patterns of receiver line signals to either or both of the primary output signal line 380 or the background/average signal line 360.

There may be benefits to selecting specific combinations of column signals to combine to obtain the average signal level, rather than combining all the pixels in a row. For example, to reduce the impact of noise contributions that have a short distance scale (but larger than the feature sizes the sensor is reading, e.g., as determined by the pitch of the pixel locations in the rows and columns), it may be beneficial to combine the signal from one or several column readout lines adjacent to the target pixel's readout line, either on one side only or on both sides. In other cases it may be preferable to combine only the signals from pixels that are relatively far from the target pixel (more than several pixels (rows or columns) away, for example, such a sensor according to aspects of the disclosed subject matter may result in improved sensitivity, e.g., compared to other passive array fingerprint sensors, e.g., 1D or 2D, and possibly lower cost than active matrix fingerprint sensors, for reasons explained above.

According to aspects of embodiments of the disclosed subject matter, there may be employed certain methods of incorporating sensor 10 readout circuitry, e.g., along with sensor elements/traces and a controller integrated circuit ("IC"). This concept is extended here to two-dimensional sensors, where the target pixel is the equivalent of an FI line, as discussed in co-pending U.S. Patent Pub US 2013/0177220 A1 to Erhart, discussed above, and the equivalent of the NI signal is actually an average of multiple pixels near the target pixel (or throughout the entire 2D array).

According to aspects of embodiments of the disclosed subject matter the number of signal lines that must be routed to the rows and columns of a fingerprint sensor array having a two-dimensional matrix format through the low performance TFT circuitry on the periphery of the sensor sensing element array can be significantly reduced. The row and column multiplexing, drive and readout circuits can be, e.g., fabricated on a separate glass sheet, e.g., using relatively low performance TFT technology, and can then be bonded as long thin strips along the periphery of the sensor pixel array. This can effectively replace the silicon IC with an IC made on glass, e.g., semiconductor-on-glass, e.g., incorporating, e.g., relatively low performance TFT circuitry, or which is otherwise much less expensive per area than, e.g., fabricating an IC on a silicon substrate using integrated circuit mask work photolithography fabrication processing.

Building the relatively lower performance and more cost effective TFT multiplexing circuitry on a glass substrate that is similar to the primary array's glass substrate, so that both the array glass and multiplexer strip glass have the same or similar coefficients of thermal expansion (CTE), also can simplify the silicon-on-glass IC attach process by eliminating CTE mismatch stresses between the array area glass and the glass substrate of a multiplexing circuit, e.g., a separate IC. The attach process can further be simplified by matching the electrode (trace) pitch of the TFT silicon-on-glass circuitry to the row and column pitch of the sensor pixel array electrodes/ traces, which may be coarser than would be expected for an entire integrated circuit made with IC made with semiconductor-on-glass technologies. A glass multiplexer circuit, e.g., made with TFTs, could be thinned prior to being attached to the array sensor electrode/traces, or it could be fabricated on thin (0.025-0.250 mm) glass initially, either in flexible form or while temporarily adhered to a carrier sheet, or otherwise, to facilitate processing.

According to aspects of embodiments of the disclosed subject matter, advantages of this form of construction for the sensor array traces and periphery circuitry, can be, e.g., for a 2D array matrix format fingerprint sensor that does not require any or at least any high performance TFT circuitry at each pixel, added row and column circuitry, such as row and column multiplexer circuitry, that can easily and at little added cost, be added to the glass substrate, dramatically reducing the number of signal lines along the ultimate periphery of the sensor pixel array, while avoiding the cost of a TFT process for the entire sensor pixel array area.

Should the primary sensor pixel array need to incorporate active TFT circuitry, if this circuitry can be implemented with a TFT process that is significantly less expensive than a higher performance TFT process, which may be required for the row and/or column multiplexer circuits, such a method could still be used to allow the sensor pixel array to be fabricated at a lower cost (for example amorphous silicon or metal oxide TFTs), while attaching the higher performance TFT multiplexer ICs to the peripheral circuitry to provide the required higher performance TFTs only where they are needed. Such can reduce the overall cost of the fingerprint image sensing device. Using a glass substrate for the multiplexer IC fabrication also, e.g., allows the CTE of the multiplexer IC to be matched to the CTE of the fingerprint pixel sensor array sensor elements, permitting more flexibility and a wider process window for the attachment process.

Figure 4B:
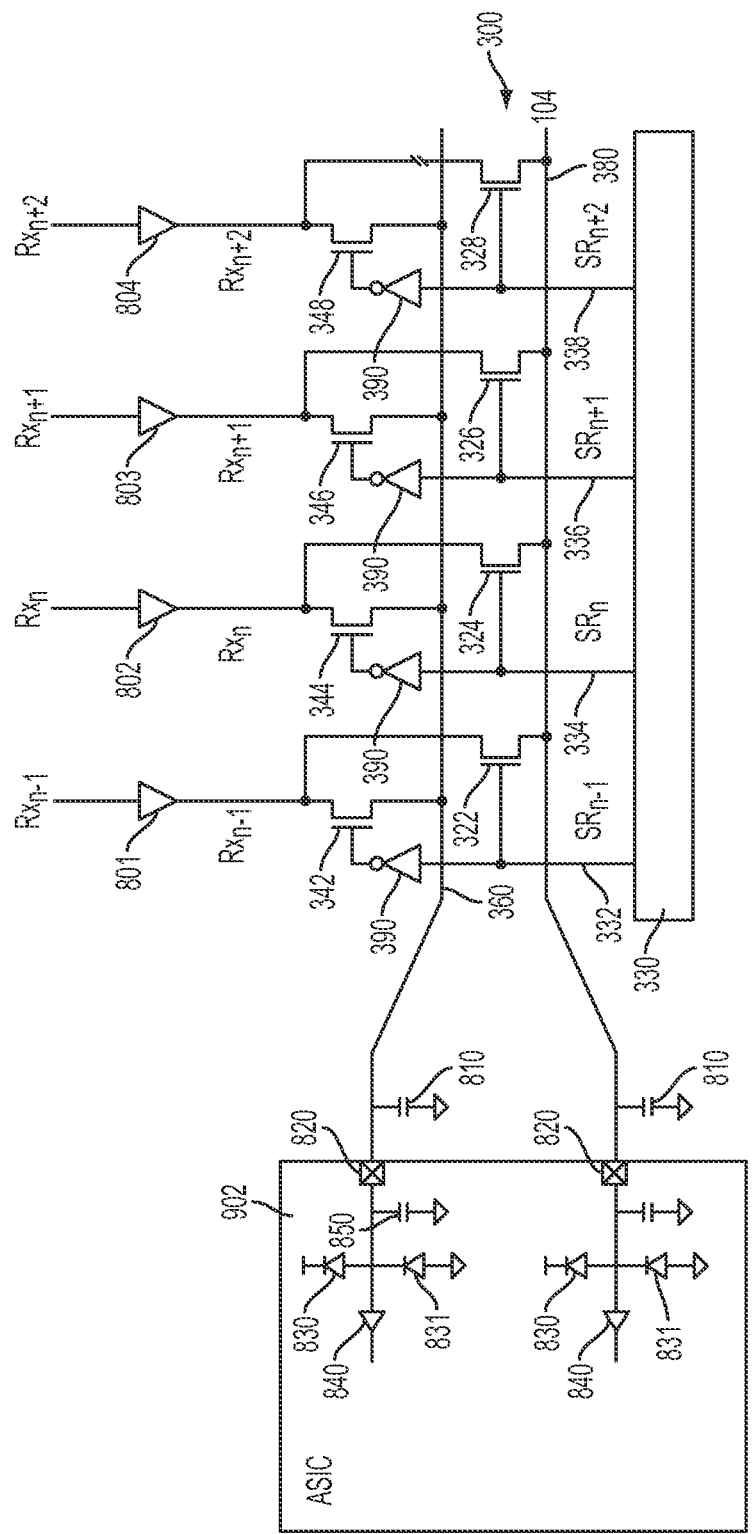

Turning now to FIG. 4B, according to aspects of embodiments of the disclosed subject matter, the just discussed advantages can be achieved also with circuitry containing "double throw" switches, such as switches 322 and 342 in combination and 334 and 344 in combination, 326 and 346 in combination and 328 and 348 in combination. Such "double-throw" switches, e.g., according to the signal present in the shift register 330, supplied by the ASIC controller 900 can connect a respective receiver electrode trace $R_{xn-1}$, $R_{Xn}$, $R_{xn+1}$, and $R_{xn+2}$, etc. to one or the other of the sense amplifier line 360 or 380. In that regard, the overall content of the shift register 330 could be considered a "single signal" from the controller, i.e., one signal controlling a plurality of single throw switches in the case, e.g., of FIG. 2B, and a plurality double throw switches in the case of FIG. 4B, or the individual shift register positions could be consider a "single signal" from the controller, controlling one single throw switch (e.g., FIG. 2B) or one double throw switch (e.g., FIG. 4B).

In FIG. 4B both main receiver sense amplifier lines 360, 380 can have their own set of background capacitances. Only one set of buffers 801, 802, 803, 804 would be necessary to drive both respective switches 322 and 342 in combination, 334 and 344 in combination, 326 and 346 in combination and 328 and 348 in combination, in the "double throw" configuration and any background capacitance 810, 850 on the other side of the switches 322 and 342 in combination, 334 and 344 in combination, 326 and 346 in combination and 328 and 348 in combination.

Each sense amplifier line 360, 380 can have its own separate ASIC amplifier 840, the output of one being connected to, e.g., a first input to a differential amplifier and the output of the other being connected to, e.g., a second input to the differential amplifier, e.g., for noise reduction. It will be understood by those of ordinary skill in the art that, e.g., depending on the number of receiver electrode traces used for noise reduction that are connected to the amplifier 840 on the sense amplifier line 380, as compared to, e.g., only one or so connected to the amplifier 840 on the sense amplifier line 360, there may have to be an adjustment to the output of the respective amplifier(s) so as not to overload one input to the ultimate differential amplifier (not shown) with respect to the other. This may be done by, e.g., preselecting a number of receiver electrode traces to be connected to each of output sense amplifier line 360 and 380 and selecting the gain of the amplifier 840 on line 360 with respect to the gain of the amplifier 840 on line 380. This could also be done dynamically as will be understood by those skilled in the art by dynamic gain adjustment circuitry (not shown) based upon the relative numbers of receiver electrode traces connected to each amplifier 840, i.e., connected to each respective sense amplifier line 360, 380. Other means of accomplishing this balancing could be done, e.g., without using a differential amplifier at all, e.g., digital to analog conversion circuitry (not shown) could be connected to the outputs of the respective amplifiers 840 on lines 360 and 380, and determining the output of the ASIC could be done digitally, including the necessary balancing.

It will be understood by those skilled in the art that the present application discloses a biometric (fingerprint) image sensing system and method that can, among other things, correct or at least alleviate problems associated with addressing hundreds or even thousands of sensor element electrode traces, e.g., in a 1D passive capacitive gap sensor array or a 2D passive capacitive gap sensor array, or subsets of such sensor element electrode traces. This may be done, e.g., by using intermediate circuitry, e.g., logic circuitry, disposed between the individual sensor element electrodes traces and an IC controller controlling the biometric image sensor which is configured to, based on a "single" command from the IC, individually address a first subset of electrodes to receive a resulting signal and individually address a second subset of electrodes to receive a noise metric signal, each used in a differential measurement with the resulting final output signal comprising an output of the biometric image sensor.

The biometric (fingerprint) image sensor may comprise a processing system configured to sense the biometric (fingerprint) image at biometric image pixel locations within an array of pixel locations and provide sensor output signals for a controller doing the processing to recreate the biometric (fingerprint) image from the pixel location output signals. The biometric image sensor may comprise a plurality of sensor elements formed by sensor element electrode traces configured to capacitively couple a drive signal applied to an input object (finger) at a\n image pixel location and received, after being capacitively altered by passing through the biometric object (finger), on a drive signal receiver electrode trace for the respective pixel location.

According to aspects of the disclosed subject matter, intermediate logic circuitry can be utilized to couple to the processing system (e.g., controller ASIC integrated circuit) and the sensor element pixel element traces. The intermediate logic circuitry, e.g., can be configured to couple at least one sensor element electrode trace(s) to a first input of a differential amplifier in the ASIC, and couple another sensor element electrode trace(s) to a second input of the differential amplifier in the ASIC. The processing system ASIC may be configured to switch the intermediate logic to couple a different second sensor element electrode trace(s) to the first differential amplifier input and couple the another sensor element electrode trace(s) to the second input of the differential amplifier based on a single control signal sent from the ASIC to the control logic, e.g., forming a multiplexer ("MUX") in the intermediate logic circuitry.

According to additional aspects of the disclosed subject matter, by utilizing thin film transistor ("TFT") logic to control the timing of the transmitters, a split transmitter state machine may be created, i.e., wherein half of the transmitter state machine is on the ASIC integrated circuit silicon die and half of the transmitter state machine is on the substrate containing the sensor element electrode traces (or attached to a substrate containing the sensor element electrode traces) in the form of TFT logic. As such, by way of example, an amplifier may be formed on each pixel location drive signal transmitter line and on each drive signal receiver line, e.g., for signal smoothing, signal boosting or the like. In addition, advantageously, one die can be created, e.g., containing the ASIC and intended to be mount to and/or be packaged in a different package, than contains the substrate(s) including the sensor element electrode traces. According to aspects of embodiments of the disclosed subject matter, such ASIC can be designed and manufactured to be "highly programmable", e.g., enabling the changing of the transmitter drive signal lines firing timing and/or order to accommodate connection to other ICs, circuitry, etc. in the overall biometric imaging sensing and recreation system, e.g., accommodating different packages and interconnections.

A buffer/unity amplifier may be coupled to respective receiver electrode trace line(s) (e.g. in a source follower configuration) to transition the received modified drive signal into the ASIC, to accommodate proper processing of such signal(s). ESD robustness can be facilitated, e.g., by removing diodes on the AISC. By selecting the properties of the TFT's used as the transmitter drive signal medium or receiver received drive signal medium, or both, the level of such signals may be increased, e.g., because such TFT's external to the ASIC can have higher voltage capability. Instead of utilizing high voltage I/O circuitry, e.g., buffers and high voltage step downs and the like, on the ASIC silicon, according to aspects of embodiments of the disclosed subject matter level translator TFT's external to the ASIC can be utilized, e.g., to produce and handle drive signals and received signals at higher voltages than the ASIC can handle. Higher voltages make the signal larger. It is harder to increase such signals within the ASIC.

In addition, it will be understood by those skilled in the art that by using TFT switches to select multiple groups of receivers the intermediate logic circuitry may be utilized to, e.g., perform functions outside the ASIC that can benefit the capture and processing of the biometric (fingerprint) image. As an example, the TFT's can be utilized, as disclosed in the present application to do code division multiplexing ("CDM") encoding of the transmitter electrodes trace inputs and receiver trace output destination(s) and the like. This can, e.g., be used to accomplish choosing which receiver electrode trace received signal goes to, e.g., the positive input of an amplifier, e.g., a differential output amplifier and which receiver electrode trace received signal(s) goes to, e.g., the negative input of the differential amplifiers. Such code division multiplexing may be done, e.g., by simply generating a coded signal to the intermediate logic circuitry to set up the multiplexing paths according to the coded signal, e.g., contained in a register the outputs of which control the outputs of the logic circuitry, as noted in the present application.

It will also be noted that the sensor elements can be coupled to/adhered a sensor substrate surface using a high K material.

As can be seen in FIG. 5, a fingerprint sensor 500 may be constructed as depicted in FIG. 5. Here the fingerprint sensor pixel sensor electrode/tracer array 506 can contains all the row and column sensor signal electrodes/traces (not shown), and could include lower performance active TFT sensor pixel circuitry (not shown), if needed, e.g., for reset, preloading, etc., but avoiding more exact and precise transistor requirements, e.g., for amplification, individual cell selection, control, etc., i.e., multiplexing, etc. A row multiplexer 510 and a column multiplexer 520, respectively, may be attached to row output lines 512 from the sensor array 506 rows (not shown)

and column output lines 522 from the sensor array 506 columns (not shown). these may be TFT-on-glass ICs that are, e.g., formed on the sensor substrate 502 or formed on a separate piece of glass (not shown) and bonded to the sensor substrate 502, or may even be a separately formed chip-on-glass ("COG") multiplexor IC mounted on the sensor substrate 502, e.g., if transparency is not an issue in the areas covered.

An optional controller IC 504, e.g., including the sensor controller circuitry, e.g., for generating the drive signals, and timing of the delivery of the drive signal to transmitter drive lines, and receiver amplification and timing and other input/output control and the like, can also be mounted on the sensor substrate 502. Otherwise the optional controller IC 504 can simply contain some additional interface circuitry formed with the less costly TFT transistor technology may interface the fingerprint sensor 500 with a remotely housed and mounted controller IC (not shown) and may also be mounted on/bonded to the sensor substrate 502 if that functionality is not already provided in the row or column multiplexer(s) 510, 520 or multiplexer ICs 510, 520.

The TFT multiplexer circuits 510, 520 and/or optional IC 504 could be fabricated on the sensor substrate 502 glass with any TFT technology that provides the necessary TFT performance, such as low temperature poly silicon ("LTPS"), e.g., where transistors are formed in or on an amorphous layer of a dielectric, such as silicon dioxide ($SiO_2$), or melted amorphous silicon forming a generally coarsely grained polysilicon layer, transparent metal oxide TFTs such as Zinc Oxide (ZnO) or Indium Gallium Zinc Oxide (IGZO), or possibly even amorphous silicon or organic TFTs. More complex circuitry and or TFT devices may be formed in, e.g., polycrystalline silicon, e.g., as may be formed by laser crystallization of amorphous silicon to form larger or non-existent grain boundaries, or the like processes. The TFT-on-glass ICs would be bonded to the sensor pixel array substrate 502 with conventional IC attach techniques, including conductive (anisotropic or isotropic) or insulating adhesives, flip chip, solder ball or like processes.

It will be understood that the fingerprint sensor 500 may be formed on a glass substrate that form, e.g., a portion of a display touchscreen or of the same material as such a touchscreen and intended for insertion into an opening formed in such a touchscreen. The array 506, with its sensor elements, multiplexers 510, 520 and optional IC 504 may be formed on/bounded to (either as separate strips of glass or other material, or separate ICs) on the inside of the touchscreen, i.e., opposite from the surface touched by a user. Products manufactured with the above described aspects of the disclosed subject matter can be expected to cost less than those which use high performance TFT technology, e.g., over the entire sensor pixel array substrate 502.

Figure 6:
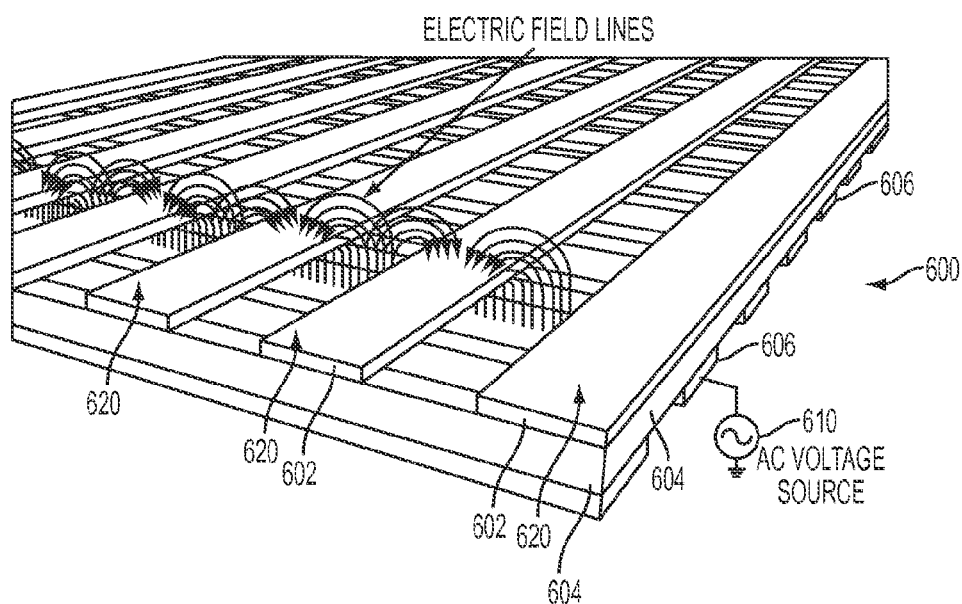
FIG. 6 shows partly schematically a biometric imaging sensor formed by a 2D grid array of capacitive gap in-active pixel location sensor elements formed on a dielectric substrate according to aspects of embodiments of the disclosed subject matter.

Referring now to FIG. 6, a diagrammatic view of one embodiment of a 2D grid array sensor 600 configured according to aspects of embodiments of the disclosed subject matter is illustrated by way of example. In this configuration, pickup/receiver electrodes/lines or top plates/traces 602 may be positioned on an insulating dielectric substrate layer 604 and configured to transmit a signal into a surface of an object located in close proximity to the pickup/receiver electrodes/traces 602. Drive lines or bottom electrode plates/traces 606 can be positioned juxtaposed to and substantially perpendicular to the pickup electrodes/traces 602 and can be located on an opposite side of the a insulating dielectric substrate 604 to form a 2D grid array if pixel locations 620 at the crossover points of the pickup electrodes/traces 602 and drive electrodes/traces 606. The pickup electrodes/traces 602 can be configured to receive the transmitted electromagnetic fields, as shown in FIG. 6, modified by the impedance characteristics on an object placed within the range of those electric fields.

FIG. 6 further illustrates how the electromagnetic fields can extend between the drive electrodes 606 and the pickup electrodes 602 through the dielectric substrate 604. Without an object within proximity, the electric field lines generally can be uniform within the sensor structure and between the different electrodes 602, 606. When an object is present, such as a finger of a user, a portion of the electric field lines can pass through the finger and can be absorbed by the finger and do not return to the pickup electrodes 602.

In operation, the drive electrodes 606, can be driven by a schematically illustrated high frequency alternating current (or pulsed square wave voltage source, or the like) 610, illustrating such drive electrode 606 being individually activated. A drive electrode 606/pickup electrode 602 pair 620 can be activated by selecting a column formed by a pickup/receiver electrode 602 that is activated, i.e., connected to an output for processing of the signal at the pixel 620. The result is a circuit that transmits electric field from active drive plate 606 into the combined dielectric of the insulating layer 604 and the finger (not shown) via the electric field lines in the vicinity of the crossover point 620, and received by the active pickup electrode 602. Some of the field lines can be captured by, or at least modified by, e.g., having a capacitive impedance changed by, the object when it is placed in the vicinity the active electrode pair 620. Variations in the finger, such as peaks and valleys and other features of fingerprint on the finger, can be detected and captured electronically by capturing and recording the resulting electric field variations occurring at respective crossover locations 620 of the drive electrodes 606 and pickup electrodes 602. Similar to common capacitance based placement sensors, the sensor can capture a type of image of the fingerprint surface electronically, and generate a representation of the features and characteristics of the fingerprint in the fingerprint sensor example described according to aspects of embodiments of the disclosed subject matter.

In this configuration of FIG. 3, only one active electrode pair is illustrated. However, the embodiment is not limited to this particular configuration, where one single electrode pair, several electrode pairs, or even all electrode pairs may be active at one time for different types of operations and signal processing to gather the individual pixel data for the reconstruction of a fingerprint image. In practice, it may be desirable for less than all of the electrode pairs to be active at a given time, so that any interference that may occur between close-by pixels would be minimized. In one embodiment, a drive electrode 606 may be activated, and the pickup electrodes 602, e.g., in a given column of pickup electrodes 602 may be scanned one or more at a time so that a column or columns pixel locations can be captured along the respective drive electrodes and pickup electrodes as they are paired along a column of crossover locations 620.

In general, in operation, each area over which a particular drive electrode 606 overlaps a pickup electrode 602 in the 2D grid array, with a separation of the insulating dielectric substrate 604 is an area that can capture and establish a sensing location that defines characteristics or features of a nearby fingerprint, e.g., in the vicinity above that area. Since there exist multiple sensing locations over the area of the 2D sensor 600 grid array, multiple data points defining features or characteristics of a nearby fingerprint can be captured by the sensor 600 configuration. Thus, the sensor 600 can operate as a planar two-dimensional sensor, where objects, such as fingers, located on or about the sensor 600 can be detected and their features and characteristics determined.

It will be understood by those skilled in the art that the disclosed subject matter provides a biometric authentication system wherein a biometric image sensor can be incorporated into a user authentication apparatus providing user authentication, e.g., for controlling access to one of an electronic user device or an electronically provided service. The electronic user device may comprise at least one of a portable phone and a computing device. The electronically provided service may comprise at least one of providing access to a web site or to an email account. The biometric image sensor may be incorporated into a user authentication apparatus providing user authentication for controlling an online transaction. The user authentication apparatus may be a replacement of at least one of a user password or personal identification number. The user authentication apparatus may be incorporated into an apparatus providing user authentication for controlling access to a physical location, or providing user authentication demonstrating the user was present at a certain place at a certain time. The user authentication apparatus may be incorporated into an apparatus providing at least one of a finger motion user input or navigation input to a computing device. The user authentication apparatus may be incorporated into an apparatus providing authentication of the user to a user device and the performance by the user device of at least one other task, e.g., specific to a particular finger of the user. The user authentication apparatus may be incorporated into an apparatus providing user authentication for purposes of making an on-line transaction non-repudiatable.

It will be understood by those skilled in the art that the disclosed subject matter may comprise a biometric imager which may comprise a plurality of sensor element traces, e.g., formed in or on a sensor substrate, which may be a glass or glasslike dielectric and may comprise at least a portion of a display screen, e.g., in a user device, such as a hand held user communication and/or computing defining a biometric sensing area and forming in-active pixel locations, such as are shown in FIG. 6; an auxiliary active circuit, such as the multiplexers shown in FIGS. 1, 2, 4 and 5, formed in or on the sensor substrate on the periphery of the biometric sensing area and in direct or indirect electrical contact with each of the plurality of sensor element traces; and the auxiliary active circuit providing a signal processing interface between the plurality of sensor element traces and a remotely located controller integrated circuit, such as a sensor controller IC. The plurality of sensor element traces may form a portion of one dimensional linear capacitive gap biometric imaging sensor. The plurality of sensor element traces may form the rows and columns of pixel locations in a two dimensional grid array capacitive gap biometric imaging sensor, such as is shown in FIG. 6. The auxiliary circuit may comprise a pixel location selection circuit or a pixel signal amplification circuit such as is shown in FIG. 5. The auxiliary circuit may be mounted on the surface of the display screen. The auxiliary circuit further may comprise a separate pixel location selection controller circuit such as is shown in FIG. 5.

Figure 7:
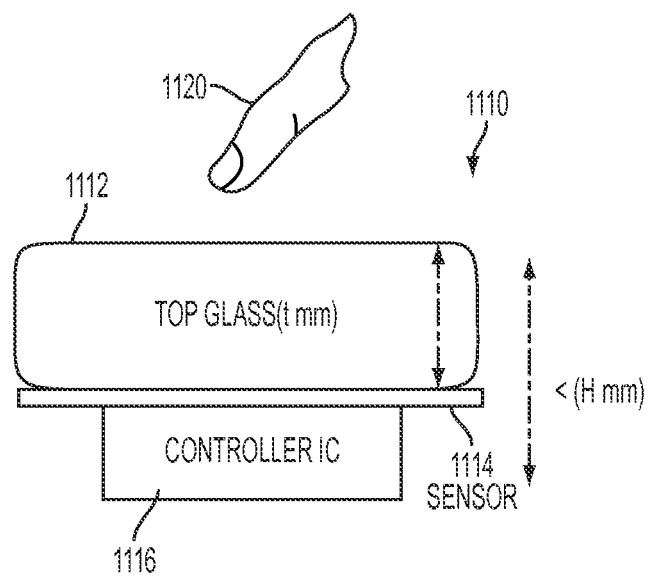
FIG. 7 shows a partial schematic of a biometric sensor.

Turning now to FIG. 7 there can be seen, partly schematically, an example of a biometric sensor 1110 for sensing a biometric, such as a fingerprint from a user finger 1120. The sensor may be formed on the surface of a top glass 1112, which may be part of a display screen, such as a touch screen. On the underside of the glass layer 1112 over which the finger 1120 of the user may be placed or swiped, may be formed a layer 1114 of material, which may be a dielectric and may be flexible, such as a film of Kapton® tape, which may have sensor element electrodes/traces formed on one or both opposing surfaces and may also have mounted thereon, e.g., by a chip on film (COF) or flip chip mounting technique a sensor controller IC 1116 to the substrate containing the sensor element electrodes/traces. As noted in this application, for some embodiments, the entire assembly may be on the order of less than 1 mm in thickness H, e.g., on the order of 0.1 mm in thickness, especially for COF types of packaging when considered without the thickness of the IC, such as when the IC is separate from the sensor. Also depending on acceptable signal level, the thickness may be on the order of 2 mm or even thicker, e.g., for flip chip mounting packages.

Figure 8:
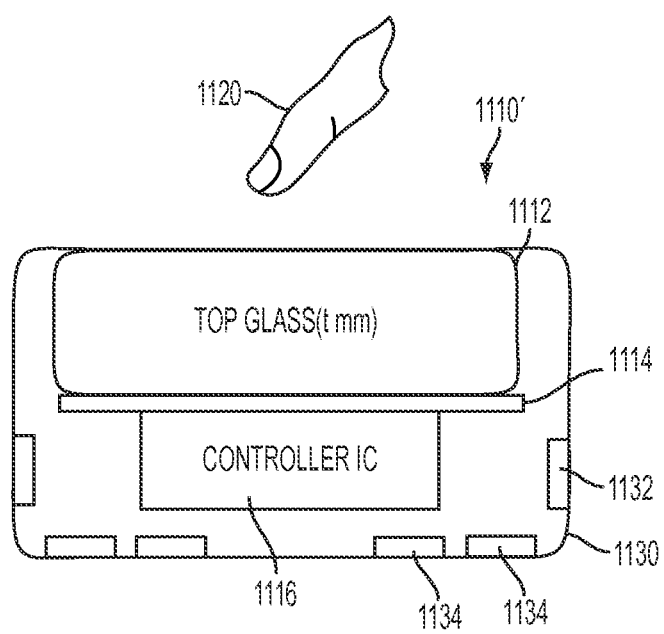
FIG. 8 shows part of a schematic of a second configuration of a biometric sensor wherein a molding or filling compound seals the IC and the sides of the glass top plate.

FIG. 8 shows partly schematically a second configuration 1110 similar to that of FIG. 7 wherein a molding or filling compound, e.g., epoxy 1130 seals in the IC 1116 and the sides of the glass top plate 1112 and allows for the formation of electrical contacts 1132 on the sides of the button assembly 1110 and 1134 on the underside of the assembly 1110, which may, as explained in more detail below, be electrically connected to the IC input/output (I/O) connectors and/or sensor electrodes/traces.

A 1D or 2D sensor on glass (SOG) can have passive elements, such as resistors or capacitors, e.g., formed into a single package, which can allow for the most flexibility, e.g., minimizing sensing location (pixel size), border (i.e., for mechanical considerations such as bezel, lowered manufacturing costs (e.g., piggy-backing on touchscreen panel formation), and smallest form factors (height, width, etc.). According to aspects of embodiments of the disclosed subject matter existing processes in both touch screen sensor fabrication (Young Fast) and assembly (STARs), with a few particularized steps, e.g., forming a planarized dielectric, and metallization for flip chip constructions are readily available.

According to aspects of embodiments of the disclosed subject matter, a quite small "round button" fingerprint sensor for a given pixel count and sensor area can be achieved, and also the flexibility exists to form any shape, e.g., round, square, square with rounded corners, etc., complimenting a number of designs for authentication biometric sensors, especially for user mobile devices, such as those employing touch-screen displays.

Referring again to FIGS. 7 and 8 the materials mentioned for each layer in those FIGS. can be substituted for by like material that yields the same function(s). For instance, the glass layer 1112 can be substituted for by non-conductive plastic such as Polycarbonate ("PC"), Poly(methyl methacrylate) ("PMMA"), a transparent thermoplastic, often used as a lightweight or shatter-resistant alternative to glass, Polyethylene terephthalate glass ("PET"), corundum such as sapphire or ruby, etc. provided the thickness of the material is appropriately adjusted to yield adequate signal strength and thus biometric sensing through the glass 1112.

Figure 9:
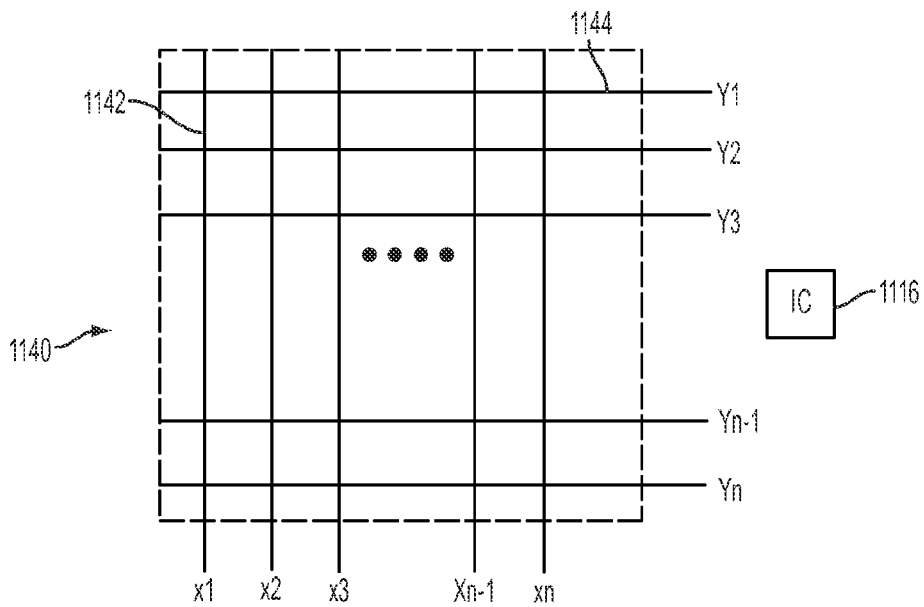
FIG. 9 shows a simplified schematic showing an X-Y sensor array block connecting to an IC.

FIG. 9 shows a simplified schematic showing an X-Y sensor array 1140 connecting to a controller IC 1116. The transmitter electrode traces X1, X2, X3, ... Xn−1, Xn 1142 and the receiver electrodes/traces Y1, Y2, Y3, ... Yn−1, Yn 1144 form a two dimensional sweep or placement biometric sensor array.

Figure 10:
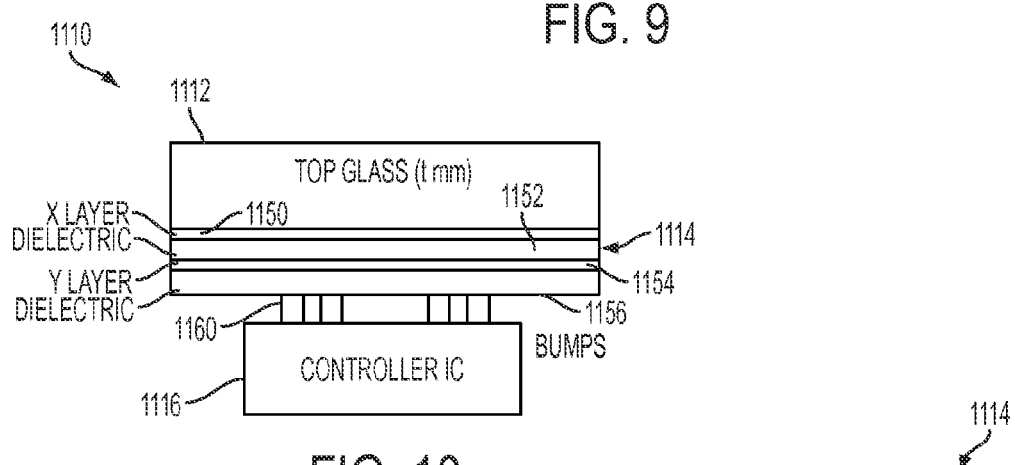
FIG. 10 shows a cross-sectional view of a compact construction for a 2D swipe or placement grid array fingerprint sensor.
Figure 11:
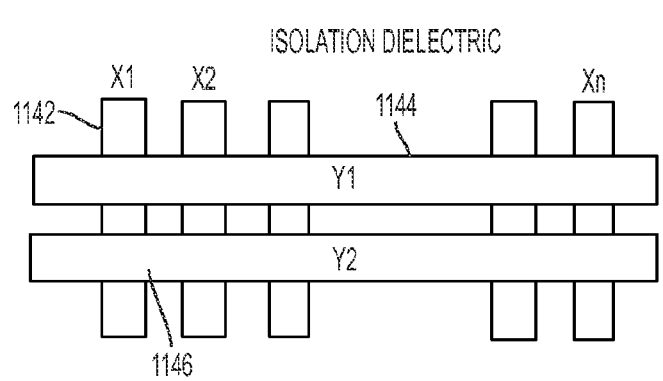
FIG. 11 shows an example of a metal layout for a sensor.

FIG. 10 illustrates a cross sectional view of a compact construction for a 2D swipe or placement grid array fingerprint sensor array 1110, e.g., with flip-chip bonded sensor controller IC. In this construction, there can be, as an example, three metal layers and two isolation dielectric layers forming a 2D sensor element layer 1114. An example of metal layout is provided in FIG. 11. An X metal layer 1150, e.g., containing the transmitter electrodes/traces, e.g., formed on a dielectric layer 1152, e.g., a flex tape, e.g., made of Kapton® tape, with a second receiver electrode/traces metal layer 1154 opposite the transmitter electrode/traces 1150. An additional dielectric layer 1156 can be connected to the sensor IC controller through ball grid array or solder grid array balls/bumps 1160 and associated vias through the dielectric layer 1156.

Figure 12A:
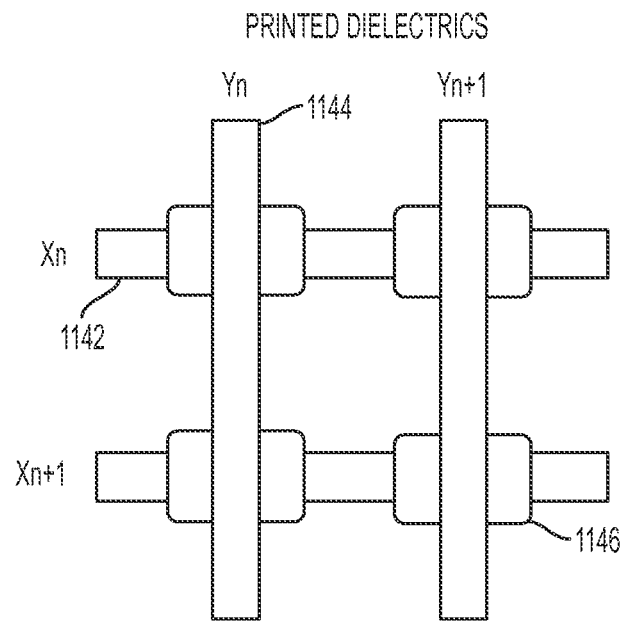
FIGS. 12A-B show transmitter or received electrode traces.
Figure 12B:
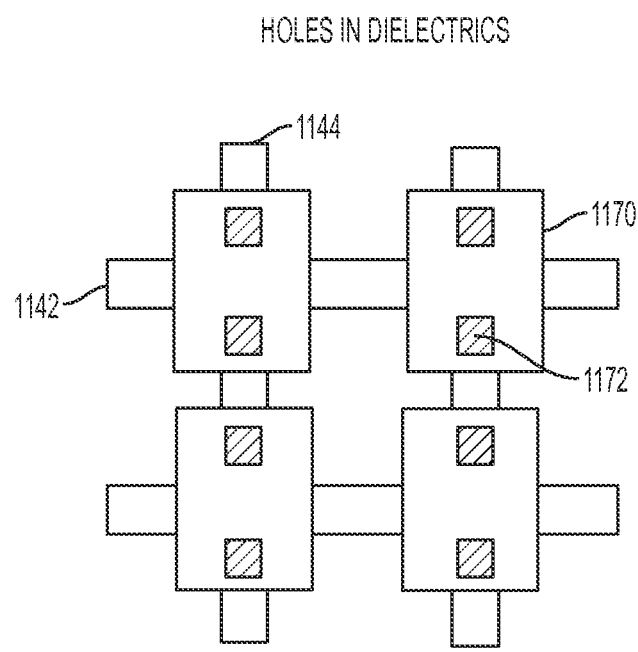

Several criteria can be utilized in selecting the pitch and/or thickness of the transmitter and receiver metal electrode/traces 1150, 1154, dielectric 1152, 1156 material, and crossover point size and shape, etc. in order to achieve optimum performance, ease of manufacturing, and lowest cost. For example, a screen-printed "pattern" of dielectric islands 1146, as also illustrated schematically in FIG. 12A can be screen-printed on the "pattern" of metal transmitter or receiver electrodes/traces 1142, 1144 in order to separate the transmitter and receiver electrodes/traces 1142, 1144 at the crossover points 1146, with a minimum of manufacturing cost. FIG. 12B illustrates schematically a case in which the dielectric layer 1170 can be deposited, e.g., as a spin-on over a large area, and then etched back to for the rectangular or other shaped dielectric layers 1170 formed intermediate the transmitter and receiver electrodes/traces. Contact holes 1172 can be formed in the dielectric islands 1170, e.g., with a mask and etch process, e.g., in order to make connection to the under-lying metal layer, e.g., the receiver layers 1144.

Figure 13A:
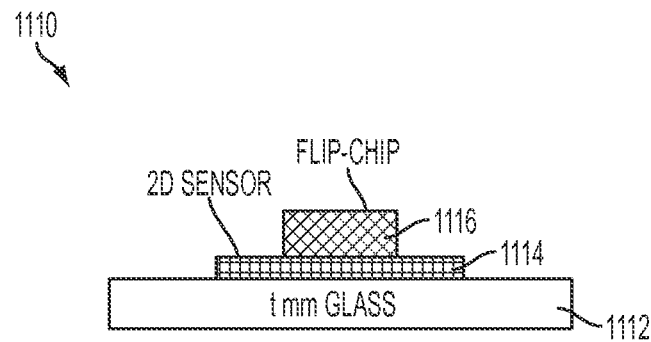
FIGS. 13A-B shows cross-sectional schematic view of sensors.

FIG. 13A shows a cross sectional schematic view of a glass mounted sensor array 1110 according to aspects of embodiments of the claimed subject matter which illustrates a simplified drawing of a "compact" form factor for a 1D or 2D sensor 1110 with a controller IC 1116 mounted on a sensor electrode/trace arrangement layer 1114, e.g., as illustrated in FIG. 7 or FIG. 10 above, intermediate and mounted to a glass layer 1112 and a controller IC 1116, e.g., attached to the sensor element arrangement 1110 by a flip chip COF mounting technique.

Figure 13B:
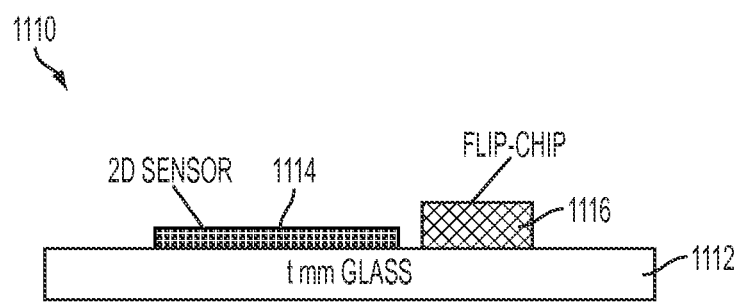

FIG. 13B illustrates schematically an alternative similar arrangement that can be achieved with one less layer of metal, e.g., resulting in lower cost manufacturing process. The construction in FIG. 13B may be suitable for a larger format such as on a cover-glass of the mobile unit, in which the 1D or 2D sensor 1110, which can be made of transparent materials, plus flip-chip controller IC 1116 could be located near an actual or virtual home button or other icon(s), since the opaqueness of the controller IC can be located away from the sensor elements/traces layer 1114 and thus also from the home button or icon(s). This latter arrangement, however, may lack some compactness.

Figure 14A:
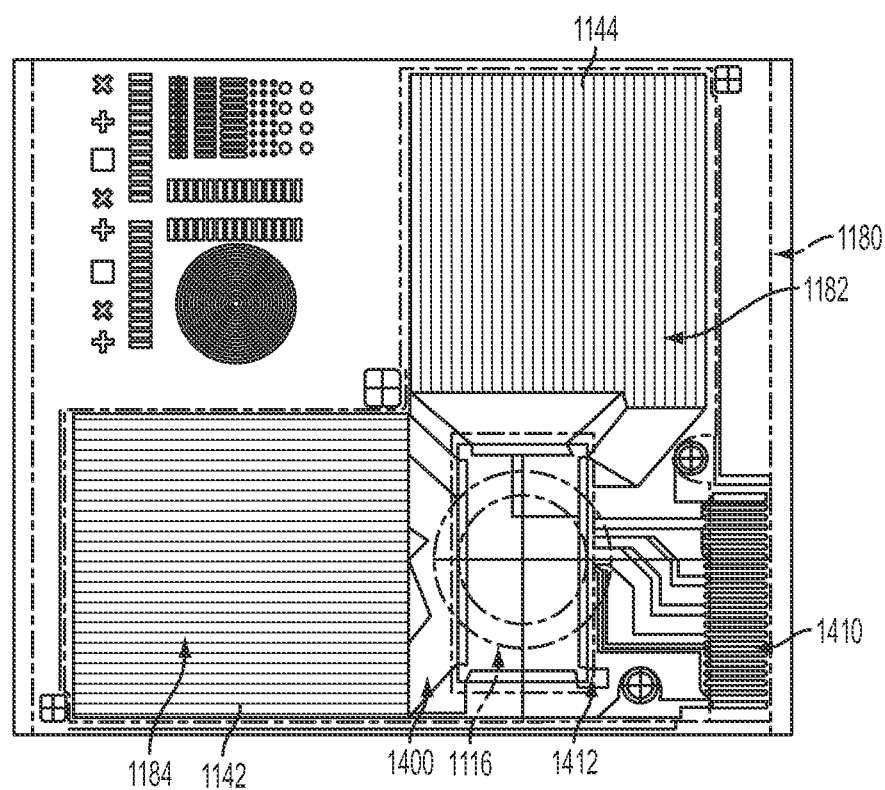

FIG. 14A shows in more detail an arrangement similar to the schematic of FIG. 13A, as is discussed in more detail in one or more of the above noted co-pending applications of the assignee of the present application, wherein the sensor elements/traces layer, i.e., the transmitter electrodes/traces 1142 and receiver electrodes/traces 1144, may be formed on one side of a substrate, e.g., a foldable flex tape 1180. The sensor controller IC 1116 may be mounted, e.g., by flip chip mounting onto the same side or opposite side of the substrate 1180, and the "wings" 1182, 1184 containing the transmitter electrodes/traces 1142 and receiver electrodes/traces 1144 folded back over the chip mounting region where the controller IC 1116 is mounted to form a structure like the schematic of FIG. 7A. That is, the controller IC 1116 will be amidst the 2D grid array sensor sensing area, mounted on one side or the other of the region of the substrate 1180.

FIGS. 14B(1), 14B(2) and 14B(3) show this fabrication assembly process in more detail. After the transmitter electrodes/traces 1142 are formed on the "wing" 1184 and the receiver electrodes/traces 1144 are formed on the "wing" 1182 a layer of dielectric and adhesive or dielectric/adhesive 1101 may be formed on the portion of the substrate 1180 containing the sensor controller IC 1116, with perhaps only adhesive necessary if the sensor controller IC 1116 is mounted on the opposite side of the layer 1180 to which the adhesive is applied, with the layer 1180 itself perhaps being a dielectric. The "wing" 1184 can then be folded over the region 1190 containing the sensor controller IC 1116. Another layer of dielectric and adhesive or dielectric/adhesive (not shown) can then be placed over the "wing" 1184 and the "wing" 1182 folded over the "wing" 1184 to form the structure of FIG. 13A.

Figure 14C:
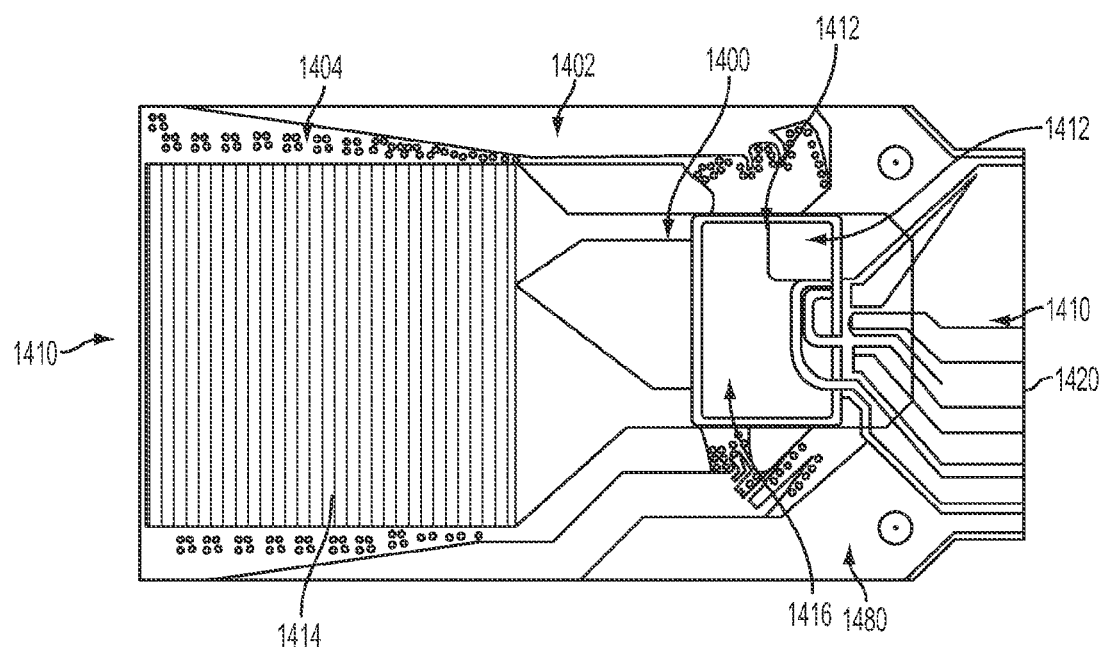

FIG. 14C shows in more detail a fabrication structure which is schematically illustrated in FIG. 13B. The sensor electrode/traces layer structure 1414 for the transmitter electrodes/traces and the receiver electrodes/traces structure are respectively formed on opposing sides of a substrate 1480 to form the 2D sensor array and the sensor controller IC 1416 is mounted on one side or the other of the substrate 1480, which may also contain, as illustrated, electrical connections 1400 from the remotely positioned sensor controller IC 1416, e.g., respectively, for the transmitter electrode/traces 1142 on one side of the substrate 1480 and the electrical connections 1402 between the receiver electrodes/traces 1144 on the opposite side, brought to the same side through vias in the substrate 1480. Also seen are connectors 1410 for connecting the flexible substrate 1480 to a package or device lead frame arrangement for connection of the sensor apparatus 1410 to another electronic device, which may include anisotropic conductive film ("ACF") bonding. FIG. 14C, as noted, shows a typical layout of a 2D sensor 1410 with controller IC 1416 placement next to the array traces structure 1414 formed on opposite sides of the substrate 1480 to illustrate the form factor shown by way of example in FIG. 13B. The bonding pads 1412 can be laid out as "bonding" pads distributed around the periphery, e.g., to allow for wire bonding to the lead frame in a standard IC package processes.

Figure 15:
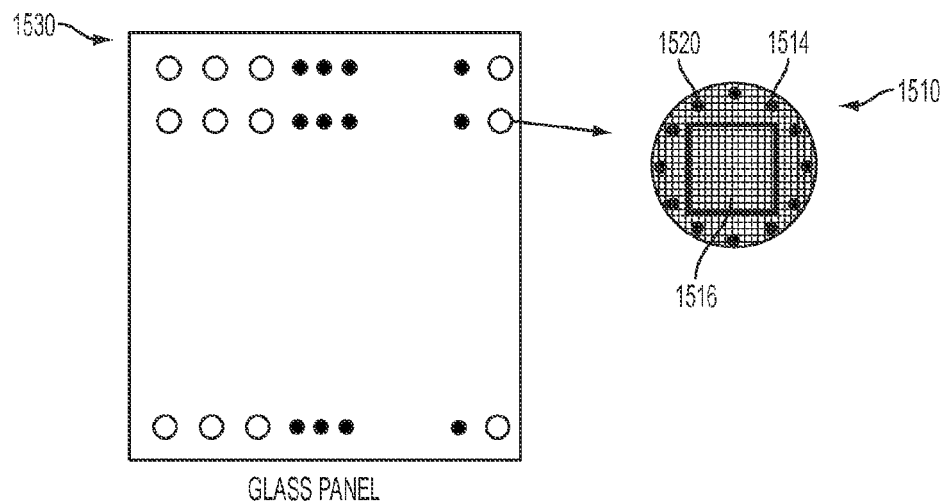
FIG. 15 shows a manufacturing process for mass producing button constructions.
Figure 17:
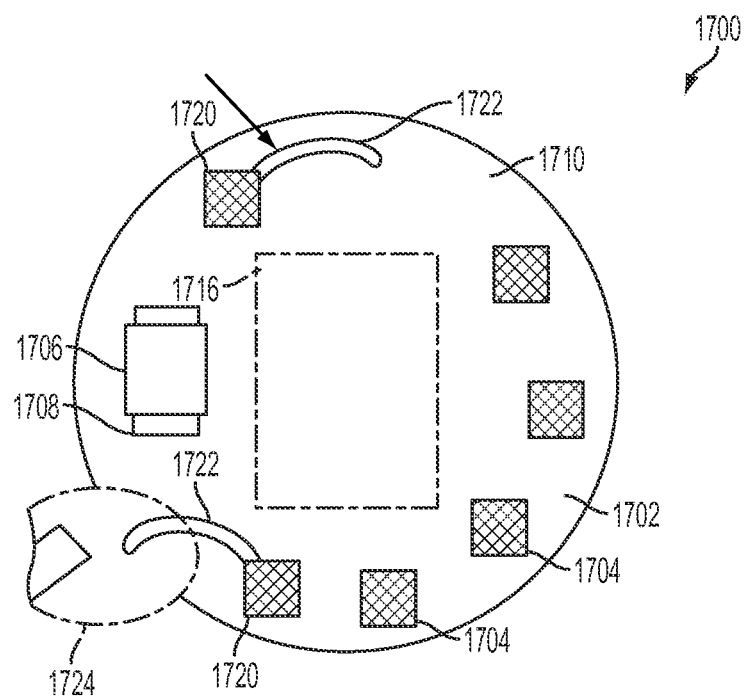
FIG. 17 illustrates components inside a form factor, such as a button.
Figure 18:
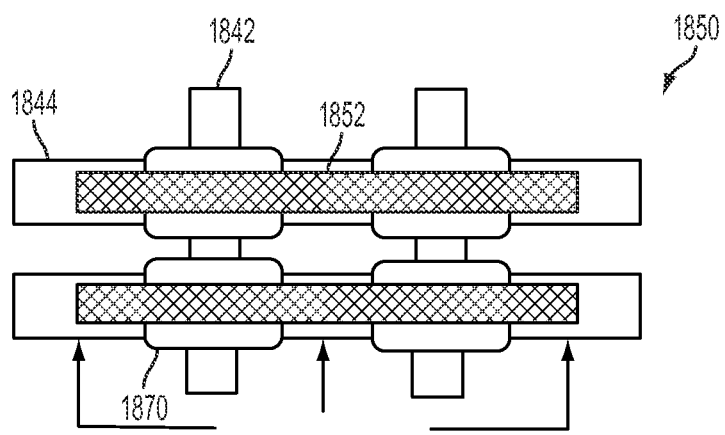
FIG. 18 illustrates a laminated copper foil with silver jumpers for a 2D sensor.

FIG. 15 shows schematically a manufacturing process for mass producing button constructions according to aspects of embodiments of the disclosed subject matter. The buttons can be formed on a glass panel 1530 such that the panel 1530 forms the substrate 1520 corresponding to substrate 1112 in FIG. 13A, with the sensor IC 1116 attached, as there shown, and having the electrodes/traces layer structure 1114. Each button 1110 can then be individually cut from the larger glass panel 1530 to form, e.g., the button of the construction shown in FIGS. 7 and 13A. As an example, in FIGS. 15 and 17, circular glass button shapes may be cut from a larger sheet of glass or other suitable material, e.g., panel 1530 in FIGS. 15 and 1710 in FIG. 17. In the button arrangement 1700 of FIG. 17, the traces (not shown), on the opposing side of the glass substrate 1710 in FIG. 17 can be connected by connectors 1704 to the controller IC 1716, e.g., through vias (not shown) in the substrate 1710 cut from the panel 1530. Some or all of the connectors 1704, e.g., illustrated as connectors 1720 may be connected to wire bonds 1722 and such wire bonds 1722 in turn be connected to a connector 1724 on another device. A passive device 1706 may be connected to the glass panel 1710 in FIG. 17 by a connector 1708 on the glass panel 1710, e.g., connected to a trace (not shown) on the opposite side of the panel 1710 to the controller IC 1716.

Figure 25:
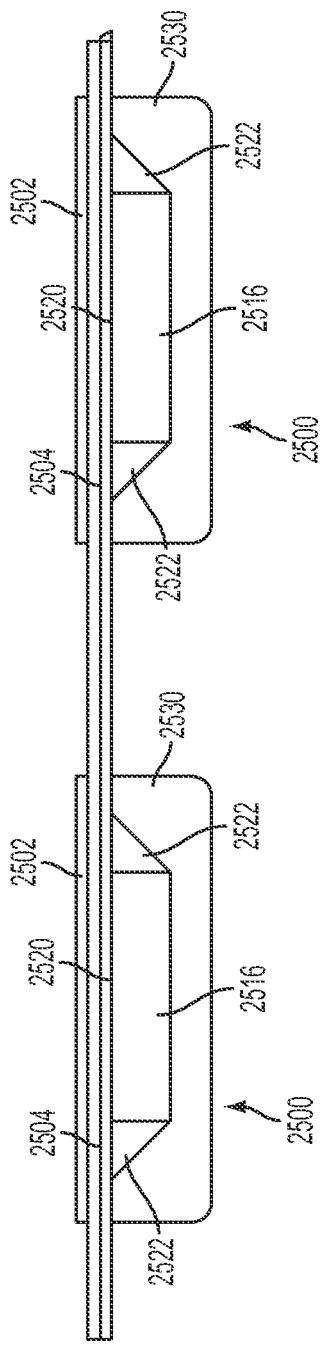
FIG. 25 is a side view of a sensor reel with a chip with the copper side down.

FIG. 25 shows a portion of a manufacturing process for a button arrangement 2500 according to aspects of an embodiment of the disclosed subject matter. The button can contain a sensor with an Application-specific Integrated Circuit ("ASIC") controller IC mounted on an opposite side of a substrate from the sensor traces (not shown). The IC 2516 can be mounted to a metallization layer 2520, which may be made of deposited and etched conductive material, such as copper (Cu) forming sensor input/output ("I/O") traces ("copper ("Cu") side down" formed on a substrate 2504. The substrate 2504 may be formed of a flexible material coming from a reel of flexible material, which may be in the form of a flex tape or sheet (suitable for multiple button arrangements 2500 to be formed using the flexible material across the width of the flexible sheet. The IC 2516 may be mounted on the flex tape/sheet by a COF mounting style, which may include an underfill sealant 2522 and may be further sealed to and adhered to the flexible tape/sheet 2504 by an encapsulant filler material, such as epoxy 2530, which may be deposited, as the flexible tape/reel 2504 moves past an encapsulation station, by, e./g., a stencil printing process. Alternatively, the fingerprint sensor sensing element electrodes/traces may be formed in the same copper layer 2520 as the IC I/O electrodes/traces.

The button arrangement 2500 may then be passed under a dielectric printing station, or the reel can be flipped and the dielectric deposition station positioned under the reel tape/sheet for the deposition of a dielectric layer 2502, e.g., formed of, as an example, a resin with interspersed high dielectric constant material(s), such as by a screen printing process. The dielectric layer 2502 then forms a protective and insulative layer over the fingerprint sensor sensing element traces formed, e.g., by a metallization layer deposition and etch process on the surface of the flexible material tape/sheet 2504 opposite from the side to which the IC 2516 is mounted. As noted above, such a process may be referred to as a copper ("Cu") down process because of the position of the surface of the flexible tape/sheet receiving the copper deposition for mounting of the IC 2516 within the button 2500 arrangement.

Figure 26:
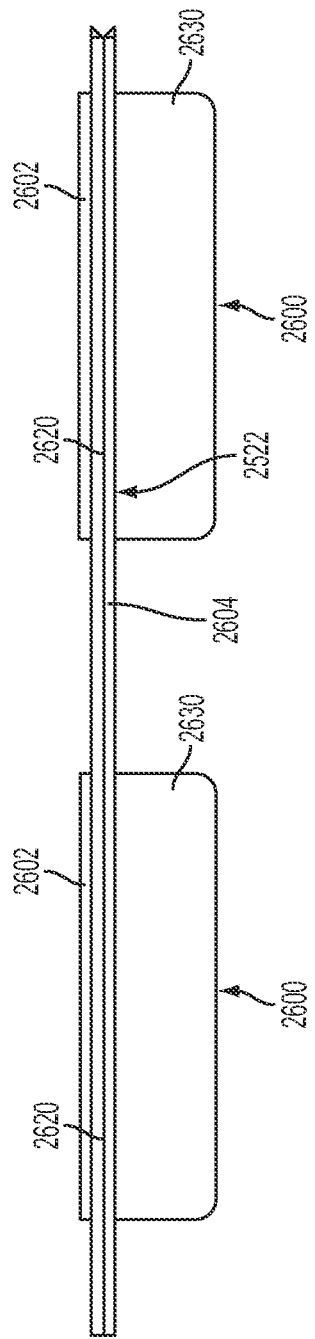
FIG. 26 is a side view of a sensor reel with a chip away from a sensor.

FIG. 26 illustrates as an example a "copper ('Cu') up" button arrangement 2600'. In the arrangement 2600', the copper deposition is on the surface of the flexible material tape/sheet 2604 on the top of the tape/sheet 2604 and, thus, above the filler material 2630 forming the rest of the button 2600' structure. The filler material 2630 is formed on the reverse side of the tape/sheet 2604. The fingerprint sensor sensing element electrodes/traces can be formed on the opposite side of the tape/sheet 2604 and extended (not shown) in some embodiments outside of the button arrangement on the tape/sheet 2604 (e.g., as seen as an example in FIGS. 21-24 and 27, for electrical connection to devices, e.g., a remote IC or a device in which the button is mounted. Such an arrangement can be referred to as a "copper ("Cu") down" button arrangement.

Figure 21:
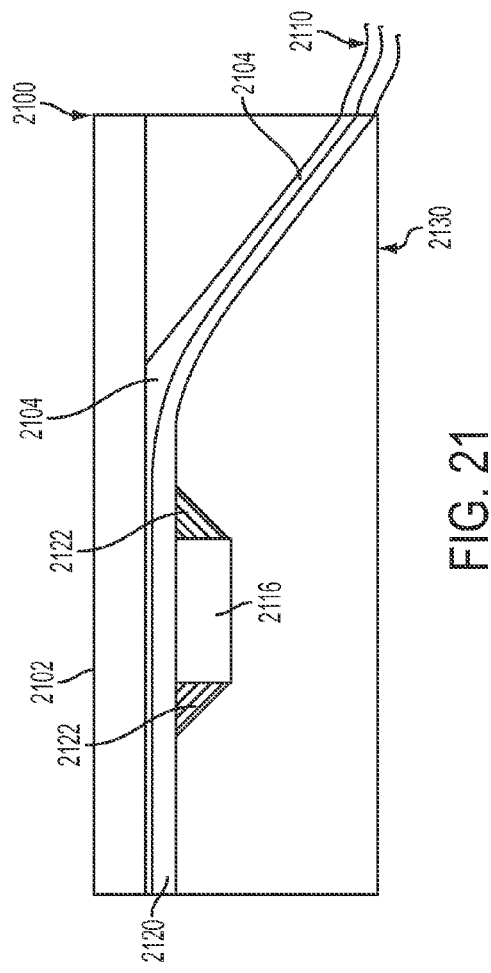
FIG. 21 is a side view of a housing with a chip positioned therein and a coating on top.
Figure 22:
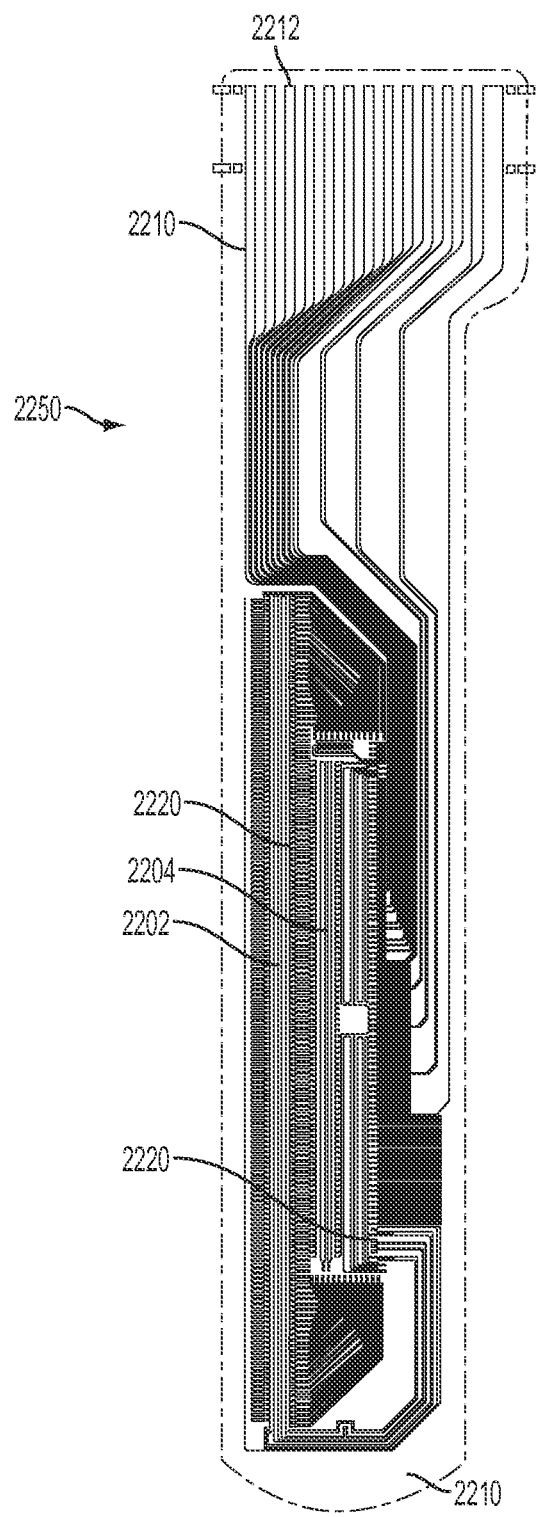
FIG. 22 illustrates a top view of a sensor and chip configuration.

FIG. 21 shows by way of example a Cu down button arrangement after further manufacturing processes, to add material to the basic button arrangements formed as discussed in regard to FIGS. 25 and 26. With the Cu side down, the ASIC IC 2116 can also be incorporated into the button structure. Additional filler material, either of the same type as molded in the processes described in regard to FIGS. 25 and 26 or of a different material with similar or the same performance characteristics may be added, e.g., to the right side of the button arrangement 2100 as shown in FIG. 21. This additional material may be added by putting the button arrangement 2500 of FIG. 25 into an injection molding machine to add this additional material encapsulating an extension of the Cu down flex tape 2504 and copper metallization layer 2520. Such an extension may further extend outside of the package 2200 for the placement of lead lines 2212 as illustrated in FIG. 22.

Figure 23:
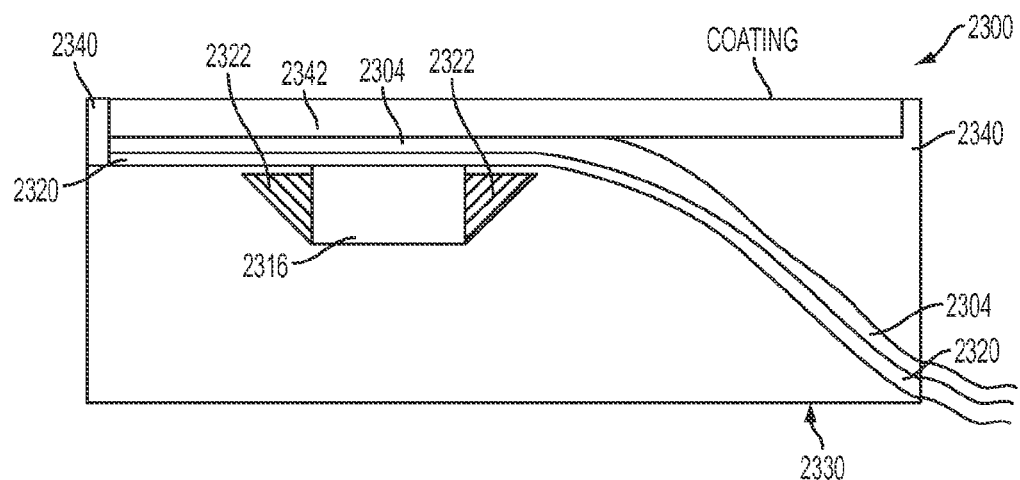
FIG. 23 is a side view of a housing with a chip wherein the top coating fits within a cavity.

FIG. 23 illustrates a formation, e.g., in an injection molding machine of added material, e.g., the same epoxy as for the filler 2330 as in FIGS. 25 and 26, or some other suitable material, on both ends of the core button arrangements 2500 of FIGS. 25 and 26. This may be utilized to form a cavity with side walls 2340 around the periphery of the button package 2300. The cavity may then be further filled with a liquid resin of the type deposited in the processes described in regard to FIGS. 25 and 26 to fill the cavity with the dielectric material 2302.

Figure 24:
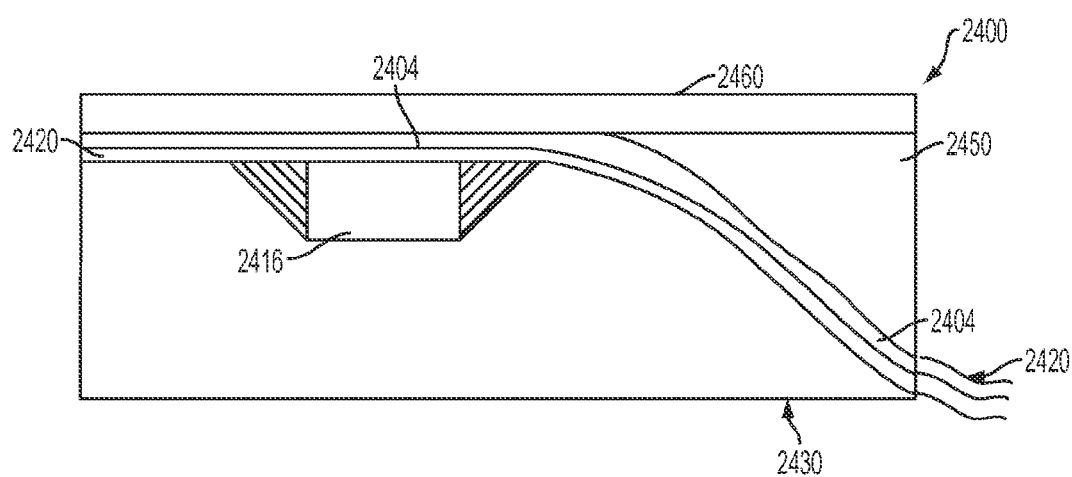
FIG. 24 is a side view of a housing with a chip wherein a thin disk or plate is attached.

FIG. 24 illustrates another example button arrangement package formed similarly to the one illustrated in FIG. 21 with the exception of the dielectric layer 2102 forming a layer 2450 that also includes or is mixed with or has deposited on top a suitable adhesive 2450 to allow for the placement of another dielectric layer 2460 formed from, e.g., corundum, otherwise known as a aluminum oxide ("αAl2O3"), with the α rep[resenting trace amounts, typically contributing to color, and also familiarly known as sapphires and rubies. Such material can be easily deposited in thin layers by thin film deposition processes known in the art. This dielectric layer can be extremely sturdy and dielectric in effect, while very thin at the same time. It will be understood by those skilled in the art that such thin film deposition may eliminate the need for some or all of the adhesive layer 2450. It will be understood that the high dielectric constant material plate, which may be attached with the thin layer of adhesives 2450 after core button assembly 2100 construction, may also be formed by thin slices of crystalline forms of αAl2O3 (corundum). Such a dielectric layer, whether thin film deposited or placed as a slice(s) may be on the order of 100 µm in thickness. Also possible is deposition through the extrusion of a thin plastic plate with interspersed high dielectric constant materials.

Figure 27:
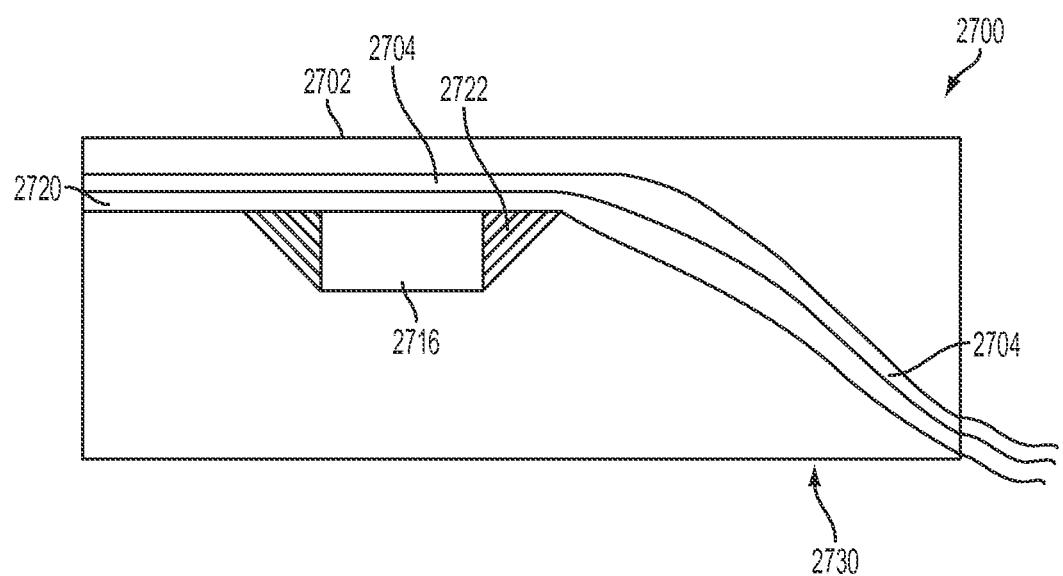
FIG. 27 is a side view illustrating the use of a coating or printing of mixed liquid resin after the button has been built similarly to FIG. 23.

FIG. 27 illustrates an example of a button arrangement package 2700 wherein the dielectric material 2702 is added to the injection molding or like process when the further filler material 2730 is formed around the extension of the flex tape 2704 and copper metallization layer 2720. Alternatively the dielectric material 2702 covering the extension of the flex tape 2704 may be added and shaped after the addition of the additional filler material 2730. As an example, a molding with a resin material that is pre-composited with the high dielectric constant materials may be utilized after the molding extending the filler material 2730 as discussed above in regard to FIGS. 21-24 or as a substitute for the step of depositing the resin as described in regard to FIGS. 25 and 26.

The aspects of the disclosed subject matter as described thus far can thus be fabricated in large volume for the consumer market. As an example of process flow may consist of major steps, such as:

start with a glass panel of desired thickness, e.g., of panel dimensions that are optimum for a given form factor;
deposit metal layer one, mask and etch, or screen-print a "patterned" metal layer one of transmitter electrodes/traces of a given width and pitch, or the like;
deposit dielectric layer one, mask, and etch, or screen-print "patterned" isolation islands, or the like;
deposit metal layer two, mask and etch, or screen-print a "patterned" metal layer two or receiver electrodes/traces of a given width and pitch, or the like;
deposit dielectric layer two;
planarize dielectric layer two to achieve flatness required for flip-chip;
flip-chip bond the controller IC; and
encapsulate the button with, e.g., a molded plastic enclosure.

A low-cost process flow may be as follows:
start with a glass panel of a desired thickness, e.g., of panel dimensions that are selected for a given form factor;
screen-print a "patterned" metal layer one formed of electrodes/traces;

screen-print "patterned" isolation islands;
screen-print a "patterned" metal layer two formed of perpendicular electrodes/traces;
deposit dielectric layer two;
planarize the dielectric layer two to achieve flatness required for flip-chip;
etch or otherwise form appropriate vias;
flip-chip bonding controller IC; and
mold the plastic enclosure.

Figure 20:
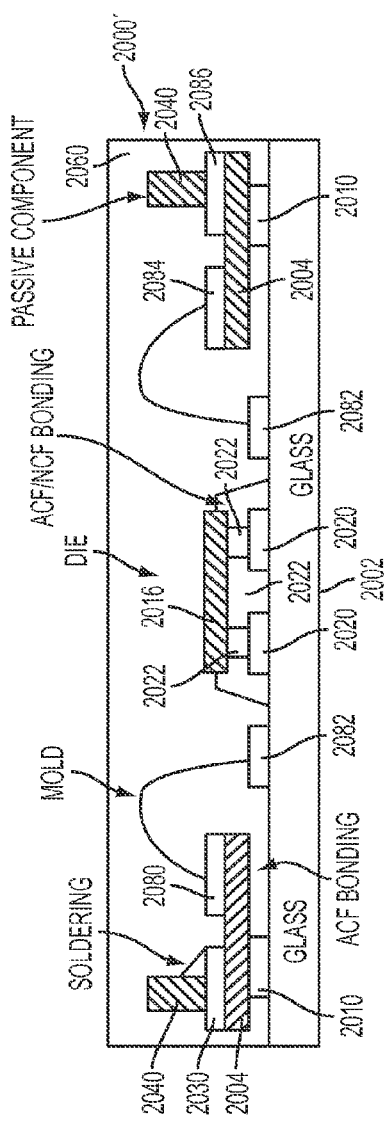
FIG. 20 illustrates an example of an electrode connected to glass by wire bonding pads.

Another variation of a low cost process flow, which can, e.g., allow for integration of passive components into the confines of the structural arrangement, such as is shown by way of an example in FIG. 20, may be as follows:
start with glass panel of desired thickness, e.g., of panel dimensions that are selected for a given form factor;
laminate a thin copper foil to the glass panel, e.g., using a "high temperature" adhesive (ADH#1);
pattern and etch the copper foil metal layer one;
deposit dielectric layer one, mask and etch; e.g. to form the dielectric islands;
screen-print a "patterned" metal layer two of electrodes/traces formed perpendicularly to the electrodes/traces of layer one;
deposit dielectric layer two;
planarize the dielectric layer two in order to achieve flatness required for flip-chip;
bond the flip-chip controller IC;
place passives as appropriate, e.g., pre-soldered passives onto the lead-frame;
wire-bond I/O leads as appropriate to the lead-frame; and
mold the plastic enclosure.

The ADH#1 material may include coloration and/or decorative additive(s) to enhance the cosmetic features of the finished product, e.g., as viewed through the topside glass. Most high dielectric constant materials are available in a powder form, and the powder can be mixed following conventional mixing techniques to disperse the respective powder(s) in various resins such as polyurethane or acrylic resins. This can be done in a fashion similar to color pigments being dispersed in inks, e.g., by using an appropriate dispersant and/or by pre-treating the appropriate surface(s). The powders may also be combined into molten resin and/or repelletized for plastic molding or extruded to produce sheets of a desired thickness. Other high dielectric constant materials can be found in bulk crystal form which can then be cut and polished to be used as a plate, e.g., placed on top of a sensor.

Figure 16:
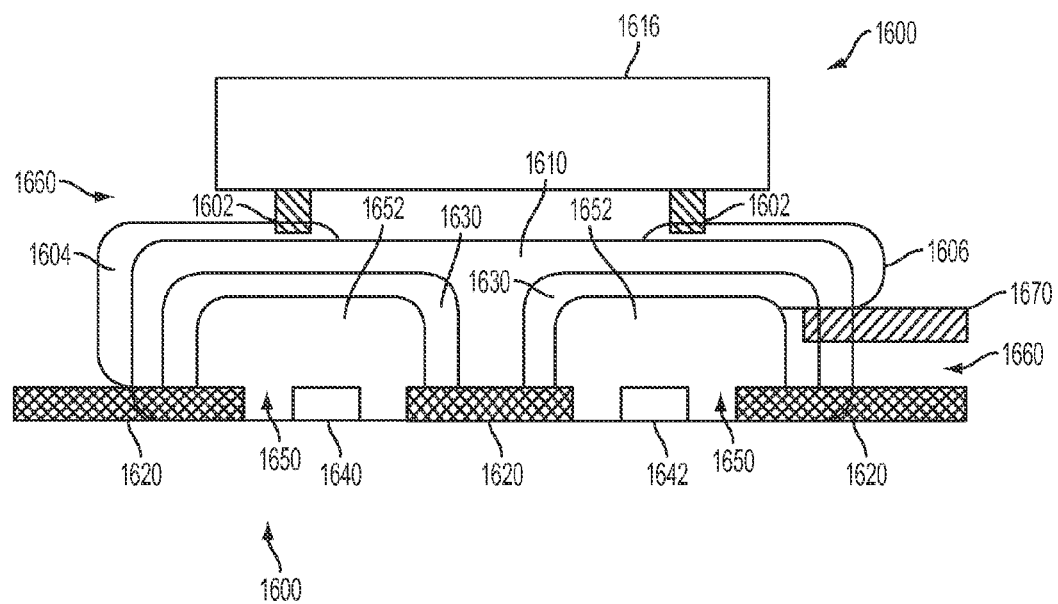
FIG. 16 illustrates a cross-sectional schematic view of a sensor electrode/trace arrangement.

FIG. 16 illustrates a cross sectional schematic view of a sensor electrode/trace arrangement 1600 as a variation of FIG. 13A. In FIG. 16 the transmitter electrodes/traces 1620 may be formed with intermediate openings 1650, through which the orthogonal receiver electrodes/traces 1640 may pass, with the openings 1650 and receiver electrodes/traces 1640, and portions of the transmitter electrodes/traces 1620 covered by dielectric islands 1652 also along the extension of the electrodes/traces 1620. The respective transmitter electrodes/traces 1620 may be bridged by jumpers 1630, which may be made of silver and may, in turn, be covered with additional dielectric islands 1610. The sensor controller IC 1616 may be mounted in a flip chip fashion by bumps 1602 which may be connected to, on the one hand, a metal lead 1604 from the transmitter electrode/trace 1620 to the sensor controller IC 1616 and, on the other hand, by a metal lead 1606, to a passive 1670 separated from the respective transmitter electrode/trace 1620 by dielectric 1660. The entire structure can be formed on the glass touch screen layer display glass 1600. According to aspects of embodiments of the disclosed subject matter, as noted above, a round area sensor on glass, e.g., with an 8 mm or 9 mm diameter and a 0.6 mm or 0.7 mm thickness is possible, integrating a system in plastic ("SIP") module.

A chip on glass ("COG") package lead frame according to aspects of the disclosed subject matter may have several options such as allowing for contact pads to be placed around the side of the button package. Alternatively, the contact pads may be placed at the bottom of the button, with the top formed by glass or other suitable transparent plastic materials such as epoxies and wherein the glass may also encapsulate the sensor IC and connections, such as wire bond connections to the bottom of the button, e.g., through connectors formed in vias.

Another COG arrangement may include a glass bottom substrate with a sensor controller IC 1616 connected to the glass through flip chip bumps which may be encapsulated in an ACF or non-conductive connective film ("NCF"). The glass may also be connected to a flex cable which may have transmitter and receiver electrode(s)/trace(s) formed on opposite sides thereof and connected to the glass by ACF bonding.

Figure 19A:
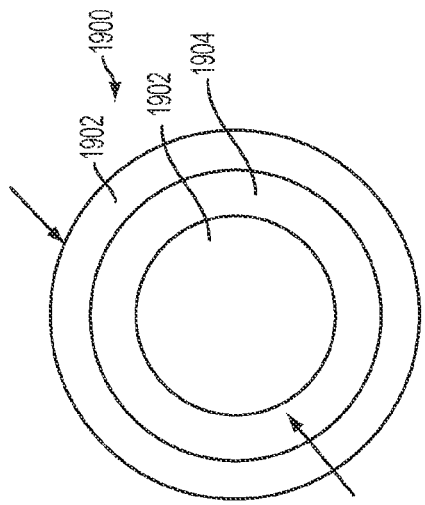
FIGS. 19A-B illustrate a chip on glass (COG) package.
Figure 19B:
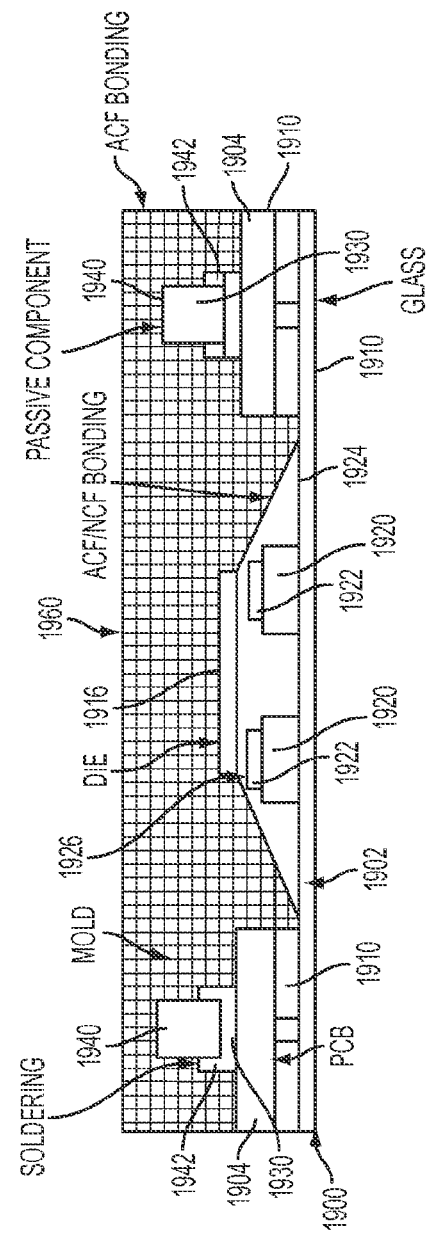

A system in a package ("SIP") 1900, as illustrated in FIGS. 19A and 19B may be formed with passive components 1940 in the package 1900. The system 1900 may have circular transmitter and or receiver electrodes 1904, one of which is illustrated schematically in FIGS. 19A and 19B. As can be seen by way of example in FIG. 19B, the electrode 1904 may be connected to the glass 1902 by ACF bonding 1910 and to the passives 1940 by conductive bonding 1930. The sensor IC may be connected to the glass 1902 by bumps 1922 and bonding pads 1920 surrounded by ACF/NCF bonding 1924. The entire system may be encapsulated by molding/filling plastic 1960. This can provide for a large sensor area with minimum border area and no need for a printed circuit board arrangement, low cost bonding and a compact form. Such a button can be round in form, be attached by a lead frame and have capacitors or other passives 1950 in the button, and may, as noted above, include wire bonding. Such may be seen by way of example in FIG. 20 where the electrode 2004 may be connected to the glass 2002 by wire bonding pads 2080, 2082 and connecting wire bonds 2086.

Addition of a sensor signal boosting structure by mixing in high dielectric constant materials to sensor packaging or coating materials can result in signal to noise ratio improvement and thus improvement of overall signal strength can be accomplished by, e.g., diffusing higher dielectric particles in coatings/protective layers/moldings and the like that are intermediate a finger of a user and the traces forming the capacitive sensor sensing elements. Thus, within a chip on film (COF) structure or a ball grid array (BGA) sensor package, both of which may be utilized for 1D linear array capacitive gap sensors and 2D sensor element grid arrays, swiped and placement, such packaged COF or BGA sensors can have components which can be integrated into, e.g., user mobile devices, such as cell phones, smart phones, pads, tablets, personal digital assistants (PDAs) and other applicable consumer electronic devices can be fabricated using multiple layers of protective dielectric material, such as molding or epoxy filling, or stacking multiple layers of hard materials for the desired hardness, durability and possibly other aesthetics, such as if the materials are transparent or pigmented or the like.

In passive capacitive biometric sensors, e.g., a fingerprint sensor, a received sensor signal can be affected by any such materials that are incorporated into any protective/decorative coating. Such a coating could form part of an insulating layer and/or a molded structure, e.g., as part of a housing or package for the sensor sensing elements and perhaps electronics, etc. When such material is situated between the sensor elements, such as may form a 1D linear array capacitive gap sensor array or a 2D grid array, swiped or placement sensor, and the finger of a user during the operation of the sensor, i.e., as the finger is placed on the sensor array or swiped over the sensor array, in most cases, the thicker the topping materials are, the lower the sensor output signal level. On the other hand, for mechanical durability and other reasons, such as electrical isolation and the like, thick and hard materials may be desirable to be placed over the sensor sensing elements. However, the thickness is, as noted, limited due to signal degradation. According to aspects of the disclosed subject matter such shortcomings in the art are at least alleviated. The sensor sensing elements, i.e., electrodes/traces may be formed on an a flexible tape layer adjacent the harder coating material separated from the user finger by the harder coating material.

The received signal across a capacitive gap in a 1D sensor or at the receiver sensor sensing element(s) in a 2D grid array sensor at a given image pixel sensing location on the grid array is largely effected by the capacitance between the user's finger and the receiver element. This is in turn affected by the type and thickness of the material between the finger and the receiver sensing element, or in some embodiments the sensing transmitter element. The conductive sensor sensing elements, e.g., made of copper (Cu) could be formed under the flex layer, and thus the dielectric effect of the flex layer would need to be factored in as well.

According to aspects of embodiments of the disclosed subject matter, the signal to noise ratio may be improved, e.g., by diffusing higher dielectric constant material(s) into the protective coating/molding/filling dielectric material so as to, e.g., allow more field flux to reach the finger of the user. That is the capacitive dielectric rating can be decreased so more electric field reaches the finger and the impact of the capacitance of the finger on the received field (i.e., whether there is a ridge or valley at the particular pixel location can be more easily detected for an given applied signal strength transmitted from the sensor transmitter element(s) in effect. Lower dielectric number materials such as a vacuum (the lack of any material), air, Teflon®, polyimide, silicon dioxide have low dielectric constant numbers (the ratio of the permissivity of the material in relation to air). These generally form better insulators between the conductive plates of a capacitor, with the lower numbers forming capacitors with higher capacitive impedance. Higher dielectric constant materials such as $TiO_2$, 86-173, strontium titanium oxide (STO), $StTiO_3$, 310 and barium strontium titanium oxide (BSTO), $BaStTiO_3$, 500 can be used as suitable diffusants/dispersants. As the coating/protective/insulative layer becomes thicker, more diffusant/dispersant of the type denoted may be utilized to maintain/increase signal to noise ratio.

3M™ Scotch-Weld™ sold under the name epoxy potting compound, DP270 is a rigid, two-part epoxy adhesive potting compound, with a 1:1 mix ratio, 70 minute work life and reaches handling strength from a relatively viscous initial state in approximately 3 hours. The material is non-corrosive to copper and finds applications in, e.g., solar energy, wind energy, composites and electronics applications for bonding, gluing, joining, attaching, assembling, encapsulating, potting and sealing. Such an adhesive may be used according to aspects of some embodiments of the disclosed subject matter.

Ferro Electronic Material Systems offers a wide variety of ceramic materials to improve the performance of organic compounds used in a broad range of applications. These additives can enhance conductivity, improve high-frequency performance, alter permittivity, modify sealing characteristics, improve flame resistance, improve moisture resistance and provide many other benefits. Such Ferro additives are examples of filled polymers. The table below lists specific products and applications. Additives can include: Barium Strontium Titanate, Strontium Titanate, Titanium Dioxide; Barium Titanate; Bismuth Trioxide; Barium Zirconate; Zirconium Oxide; Ceramic Powders. Each application can require specific physical characteristics and variables can be adjusted to meet the needs for filled polymers applications. For example, varying the amount of barium and strontium in an additive can shift the Curie Point of the composite material, e.g., to enhance performance over a specific temperature range. Table I discloses possible materials for use as high dielectric additives.

TABLE I

| Ceramic Powders | Typical Application | Particle Size Dist. (μm) | | | Surface Area (m²/g) |
|---|---|---|---|---|---|
| | | D90 | D50 | D10 | |
| 104-2 Zirconium Oxide I | Plastic filler | 3.3 | 0.8 | 0.34 | 10.51 |
| 119 Barium Zirconate | Plastic seals and molding | 3.1 | 1.0 | 0.61 | 4.16 |
| 203-4 Titanium Dioxide | Filled polymers to reduce dielectric constant and promote high frequency performance | 1.7 | 1.1 | 0.65 | 4.7 |
| Ticon ® HG Titanium Dioxide | Filled polymers to reduce dielectric constant and promote high frequency performance | 4.5 | 3.0 | 1.5 | 2.3 |
| Ticon ® CG Titanium Dioxide | Filled polymers to reduce dielectric constant and promote high frequency performance | 7.2 | 4.0 | 1.9 | — |
| 217 Calcium Titanate | Polymer antennas and other telecom applications | 4.2 | 1.6 | 0.75 | 4.55 |
| 218 Strontium Titanate | Filled polymers to promote high frequency performance; toners and anticounterfeiting applications | 4.6 | 2.0 | 0.93 | 1.81 |
| Ticon ® 55 Strontium Titanate | Filled polymers to promote high frequency performance | 2.9 | 1.1 | 0.5 | 4.3 |

TABLE I-continued

| Ceramic Powders | Typical Application | Particle Size Dist. (μm) | | | Surface Area (m²/g) |
|---|---|---|---|---|---|
| | | D90 | D50 | D10 | |
| 219-6A Barium Titanate | Dielectric constant booster for filled circuit boards, electroluminescent lights and other filled applications | 2.1 | 1.3 | 0.8 | 2.1 |
| Ticon ® C Barium Titanate | Dielectric constant booster in filled circuit boards and other filled applications | 3.8 | 1.5 | 0.6 | 2.4 |
| Ticon ® HPB Barium Titanate | Electroluminescent lighting | 2.1 | 1.0 | 0.4 | 3.2 |
| BST Barium Strontium Titanate | Filled polymers to promote targeted high-frequency performance | | | | |
| 320A Bismuth Trioxide | Density modifier for plastics | 16 | 6.1 | 1.5 | 0.2-0.5 |
| AD143N Ceramic Powder | Dielectric constant booster in filled circuit boards and other filled applications | 1.9 | 0.9 | 0.5 | 3 |

According to aspects of embodiments of the disclosed subject matter suitable high dielectric constant materials can be used to incorporate into selected resins for sensor packaging. For the ease of dispersions, sub-micron or even finer nanoparticles can provide excellent candidates to fill the resins. One can determine the mass loading of high dielectric constant materials, where the mass loading % is determined based on viscosity requirements and molding techniques. If additional steps such as polishing or grinding of the signal boosting structure (SBS) are required, consideration of such subsequent process steps can be taken. There are many ways to create the SBS, after complete diffusion of high dielectric constant materials: 1) coating/printing of mixed liquid resin, 2) injection molding, 3) cavity filling, 4) plate attachment, etc. These steps could be considered and selected, based on sensor design and integration needs. A uniformly thick SBS may be required or at; least preferred across the full length of the sensor and to be able to reproduce consistent thickness from one packaged sensor to another. Additional layers can be incorporated on top of the SBS for aesthetic purposes. The final layers should not significantly alter the sensor performance yet survive through a series of reliability tests which are defined by customers.

FIG. 22 illustrates schematically an arrangement 2250 wherein a sensor controller IC chip can be connected to a substrate 2210. This may then be connected to another module by lead lines 2212 formed on the substrate 2210. The IC may be connected to the substrate 2210 by bonding pads 2220, which may, in turn, be connected to primary and secondary receiver traces 2202, 2204 and transmitter traces at the locations 2220 of the bonding pads, since the electrical traces as illustrated in FIG. 22 are on the same side of the substrate 2210 as the IC mounting pads 2220 and, therefore, the IC itself.

Methods for manufacturing any of the various devices disclosed can be summarized as follows:

Select suitable high dielectric constant materials to incorporate into selected resins for sensor packaging. For the ease of dispersions, sub-micron or even finer nanoparticles are the excellent candidates to fill the resins.

Determine mass loading of high dielectric constant materials. Mass loading % is determined based on viscosity requirements and molding techniques. If additional steps such as polishing or grinding of the signal boosting structure (SBS) are required, consideration of such subsequent process steps must be taken.

There are many ways to create the SBS, after complete diffusion of high dielectric constant materials as shown, e.g., in FIGS. 19-24: 1) coating/printing of mixed liquid resin, 2) injection molding, 3) cavity filling, 4) plate attachment, etc. These steps could be considered and selected, based on sensor design and integration needs. It is critical to have a uniformly thick SBS across the full length of the sensor and to be able to reproduce consistent thickness from one packaged sensor to another.

Additional layers can be incorporated on top of the SBS for aesthetic purposes. The final layers should not significantly alter the sensor performance yet survive through a series of reliability tests which are defined by customers.

It will be understood that a biometric object sensor button arrangement core and method of forming the same is disclosed which may comprise a flex material layer; a sensor controller IC mounted on one side of the flex material layer; a metallization layer comprising a plurality of sensor sensing element traces and controller IC input/output traces formed on at least one side of the flex material layer, each in electrical connection with controller IC; an encapsulation layer encapsulating the controller IC to one of the flex material layer and the metallization layer; and a protective layer covering one of the flex material layer and the metallization layer on a surface opposite from where the controller IC is mounted, comprising a dielectric material dispersed with at least one high dielectric material utilizing a dispersant. The biometric object sensor button may further comprise a fingerprint sensor button. The metallization layer may comprise a first metallization layer formed on a first surface of the flex material comprising the sensor sensing element traces and a second metallization layer formed on a second surface of the flex layer opposing the first surface of the flex layer and comprising at least some of the controller IC input output traces. The button arrangement core may further comprise an extension of the flex layer and the metallization layer extending from the encapsulation layer and a further encapsulation of the extension of the flex layer from the button arrangement core and the extension of the metallization layer from the button arrangement core to form a button arrangement package. A further encapsulation of the extension of the flex layer and a further deposition of dielectric material on the metallization layer may be included to form a button arrangement package. The button arrangement core may further comprise an adhesive layer covering the one of the flex layer and the metallization layer and the extension of the encapsulation of the flex layer and the metallization layer; and a layer of dielectric material adhered to the adhesive layer, which may be corundum and may be deposited by thin film deposition or as a thin crystalline sheet(s). The method may comprise forming a flex material layer; mounting a sensor controller IC on one side of the flex material layer; forming a metallization layer comprising a plurality of sensor sensing element traces and controller IC input/output traces formed on at least one side of the flex material layer, each in electrical connection with controller IC; encapsulating the controller IC in an encapsulation layer formed on one of the flex material layer and the metallization layer; and forming a protective layer covering one of the flex material layer and the metallization layer on a surface opposite from where the controller IC is mounted, comprising a dielectric material dispersed with at least one high dielectric material utilizing a dispersant.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of imaging a biometric object comprising:
    utilizing a biometric image sensor, the biometric image sensor comprising:
        a plurality of capacitive gap sensor electrode traces forming an array of biometric sensor imaging pixel locations within a biometric sensing area of the biometric image sensor,
            at least one of the sensor electrode traces forming a drive signal transmitter electrode and at least one of the sensor electrode traces forming a resulting signal receiver electrode trace, the respective drive signal transmitter electrode and respective resulting signal receiver electrode trace being formed on one of a single side of a first substrate and an opposite side of the first substrate;
            wherein a change in a resulting signal received by the resulting signal receiver electrode trace is indicative of a biometric image characteristic at a respective pixel location in the array;
    utilizing a controller contained in an integrated circuit mounted to a second substrate remote from the biometric sensing area and in electrical contact with the sensor electrode traces;
    utilizing an intermediate logic circuit formed between the controller and the sensor electrode traces in the biometric sensing area, wherein the intermediate logic circuit is formed on at least one of the first substrate and a third substrate mounted to the first substrate,
    the intermediate logic circuit configured to control an activation sequence for a subset of the plurality of the capacitive gap sensor array pixel locations in response to a single signal from the controller to the intermediate logic circuit.

2. The method of claim 1 wherein the first substrate and the second substrate comprise a single substrate.

3. The method of claim 2 wherein the single substrate comprises one of a flexible dielectric and a glass substrate.

4. The method of claim 1 wherein the single signal from the controller comprises a first coded control signal, and the intermediate logic circuit is configured to, in response to receiving the single signal, individually address a subset of resulting signal receiver electrode traces and communicatively couple the respective resulting signal receiver electrode trace to a first input of the controller.

5. The method of claim 1 wherein the single signal from the controller comprises a second coded control signal causing the intermediate logic circuit to both (1) individually address a third subset of resulting signal receiver electrode traces and provide a received resulting signal to a first output of the intermediate logic circuit and (2) individually address a fourth subset of resulting signal receiver electrode traces and connect the respective resulting signal receiver electrode trace to a second output of the intermediate logic circuit.

6. The method of claim 5 wherein the first output comprises a first input to a differential amplifier and the second output comprises a second input to the differential amplifier.

7. The method of claim 5 wherein the second coded control signal comprises an output of a shift register set by the controller, communicatively coupling the control logic routing respective individual resulting signal receiver electrode traces to the first output or second output.

8. The method of claim 7 wherein the intermediate logic circuit comprises logic circuit transistor switches formed on at least one of the first substrate and the third substrate.

9. The method of claim 8 wherein the logic circuit transistor switches comprise thin film transistors.

10. The method of claim 1 wherein the intermediate logic circuit further comprises a thin film transistor amplifier formed on one of the first substrate and the third substrate between a resulting signal electrode trace and the intermediate logic circuit.

11. A biometric object imaging sensor comprising:
    a plurality of capacitive gap sensor electrode traces formed on one of a single side of a first substrate and an opposite side of the first substrate; the plurality of sensor electrode traces forming an array of biometric sensor imaging pixel locations within a biometric sensing area of the biometric image sensor,
    wherein at least one of the sensor electrode traces comprises a transmitter electrode trace and at least one of the sensor electrode traces comprises a receiver electrode trace, wherein a change in a resulting signal received by the receiver electrode trace is indicative of a biometric image characteristic at a respective pixel location in the array;
    a controller contained in an integrated circuit mounted to a second substrate remote from the biometric sensing area and in electrical contact with the sensor electrode traces;
    an intermediate logic circuit between the controller and the sensor electrode traces in the biometric sensing area, formed on at least one of the first substrate and a third substrate coupled to the first substrate, the intermediate logic circuit configured to control an activation sequence for a subset of the plurality of the capacitive gap sensor array pixel locations in response to a single signal from the controller to the intermediate logic circuit.

12. The biometric object imaging sensor of claim 11 wherein the first substrate and the second substrate comprise a single substrate.

13. The biometric object imaging sensor of claim 12 wherein the single substrate comprises one of a flexible dielectric and a glass substrate.

14. The biometric object imaging sensor of claim 11 wherein the single signal from the controller comprises a first coded control signal, configured to cause the intermediate logic circuit to one of (1) individually address a first subset of transmitter electrode traces and provide a drive signal to the transmitter electrode trace and (2) individually address a second subset of receiver electrode traces and connect the receiver electrode trace to an output of the biometric imaging sensor.

15. The biometric object imaging sensor of claim 11 wherein the single signal from the controller comprises a second coded control signal, configured to cause the intermediate logic circuit to both (1) individually address a third subset of receiver electrode traces and provide a first received resulting signal to a first output of the intermediate logic circuit and (2) individually address a fourth subset of the receiver electrode traces and provide a second received resulting signal to a second output of the intermediate logic circuit.

16. The biometric object imaging sensor of claim 15 wherein the first output comprises a first input to a differential amplifier and the second output comprises a second input to the differential amplifier.

17. The biometric object imaging sensor of claim 15 wherein the second coded control signal comprises an output of a shift register set by the controller, connected to control logic routing respective receiver electrode traces to the respective first output or second output.

18. The biometric object imaging sensor of claim 17 wherein the intermediate logic circuit comprises logic circuit transistor switches formed on at least one of the first substrate and the third substrate.

19. The biometric object imaging sensor of claim 18 wherein the logic circuit transistor switches comprise thin film transistors formed on the one of the first substrate and the third substrate.

20. The biometric object imaging sensor of claim 10 wherein the intermediate logic circuit further comprises a thin film transistor amplifier formed on one of the first substrate and the third substrate between a respective receiver electrode trace and the intermediate logic circuit.

* * * * *